(12) United States Patent
Matsunaga

(10) Patent No.: US 12,093,956 B2
(45) Date of Patent: Sep. 17, 2024

(54) VEHICLE USE ASSISTANCE SYSTEM AND A VEHICLE USE ASSISTANCE METHOD

(71) Applicant: Chikara Matsunaga, Kobe (JP)

(72) Inventor: Chikara Matsunaga, Kobe (JP)

( * ) Notice: Subject to any disclaimer, the term of this patent is extended or adjusted under 35 U.S.C. 154(b) by 907 days.

(21) Appl. No.: 17/046,902

(22) PCT Filed: Apr. 11, 2018

(86) PCT No.: PCT/JP2018/015298
§ 371 (c)(1),
(2) Date: May 10, 2021

(87) PCT Pub. No.: WO2019/087432
PCT Pub. Date: May 9, 2019

(65) Prior Publication Data
US 2022/0084331 A1    Mar. 17, 2022

(30) Foreign Application Priority Data

Nov. 2, 2017 (WO) ................. PCT/JP2017/039703

(51) Int. Cl.
*G07C 5/08* (2006.01)
*B60W 40/09* (2012.01)
(Continued)

(52) U.S. Cl.
CPC ....... *G06Q 20/40145* (2013.01); *B60W 40/09* (2013.01); *G06F 21/32* (2013.01);
(Continued)

(58) Field of Classification Search
CPC .......... G06Q 20/40145; G06Q 20/4012; G06F 21/32; G06F 21/602; G06F 21/6218;
(Continued)

(56) References Cited

U.S. PATENT DOCUMENTS 7,606,915 B1 * 10/2009 Calinov ................. G06F 21/36
709/229
8,579,192 B1   11/2013 Miller et al.
(Continued)

FOREIGN PATENT DOCUMENTS

JP   H11-195033    7/1999
JP   2001-241229   9/2001
(Continued)

OTHER PUBLICATIONS

International Search Report and Written Opinion of PCT/JP2018/015298, Jul. 10, 2018, 4 pages including English translation.
(Continued)

*Primary Examiner* — Mussa A Shaawat
(74) *Attorney, Agent, or Firm* — HSML P.C.

(57) ABSTRACT

A vehicle use assistance system, in which security settings are also set in operations such as approval, confirmation, and recording of content accompanying termination of an application file uses an open passcode for opening a vehicle use assistance application 120 and a close passcode for performing normal termination of and closing a vehicle use assistance application file 130 in an open state are set for each of vehicle use assistance application files 130 used by a vehicle use assistance application 120 that assist with the use of various functions with which a vehicle 200 is equipped. A vehicle use assistance system 100 is equipped with: an application file unlocking function for receiving input of an open passcode and opening a vehicle use assistance application file 130; and an application file locking function for receiving input of a close passcode and performing normal termination of an closing a vehicle use assistance application file 130 that is in an open state.

18 Claims, 21 Drawing Sheets

(51) Int. Cl.
*G06F 21/32* (2013.01)
*G06F 21/60* (2013.01)
*G06F 21/62* (2013.01)
*G06F 21/78* (2013.01)
*G06Q 20/40* (2012.01)
*G07C 9/00* (2020.01)

(52) U.S. Cl.
CPC ........ *G06F 21/602* (2013.01); *G06F 21/6218* (2013.01); *G06F 21/78* (2013.01); *G06Q 20/4012* (2013.01); *G07C 5/085* (2013.01); *G07C 9/00309* (2013.01); *G07C 2009/00388* (2013.01)

(58) Field of Classification Search
CPC ..... G06F 21/78; G07C 5/085; G07C 9/00309; G07C 2009/00388; H04L 63/0861; H04W 4/40; H04W 12/06
See application file for complete search history.

(56) References Cited

U.S. PATENT DOCUMENTS

| | | | |
|---|---|---|---|
| 9,047,728 B1 | 6/2015 | Irudayam et al. | |
| 9,129,118 B1* | 9/2015 | Johansson | G06F 21/6245 |
| 9,503,451 B1* | 11/2016 | Kane-Parry | H04L 63/083 |
| 9,824,207 B1* | 11/2017 | Kane-Parry | G06F 21/46 |
| 10,176,318 B1* | 1/2019 | Kane-Parry | G06F 21/46 |
| 10,638,281 B1* | 4/2020 | Mezaael | H04W 4/46 |
| 11,418,938 B1* | 8/2022 | Kumar | G01C 21/26 |
| 2002/0198834 A1* | 12/2002 | Kramer | G06Q 30/0601 |
| | | | 705/40 |
| 2007/0022301 A1* | 1/2007 | Nicholson | G06Q 20/4014 |
| | | | 713/184 |
| 2010/0332823 A1* | 12/2010 | Tsujimoto | H04N 1/4413 |
| | | | 726/3 |
| 2013/0259232 A1 | 10/2013 | Petel | |
| 2015/0358798 A1* | 12/2015 | Okawa | H04W 8/18 |
| | | | 455/404.2 |
| 2016/0071333 A1* | 3/2016 | Haidar | G07C 5/006 |
| | | | 701/29.3 |
| 2016/0096508 A1* | 4/2016 | Oz | H04L 67/125 |
| | | | 701/36 |
| 2016/0099927 A1* | 4/2016 | Oz | G07C 5/0808 |
| | | | 726/9 |
| 2016/0306350 A1 | 10/2016 | Shim et al. | |
| 2016/0371907 A1 | 12/2016 | Ma et al. | |
| 2017/0039599 A1* | 2/2017 | Tunnell | G06Q 30/0241 |
| 2017/0267214 A1 | 9/2017 | Penilla et al. | |
| 2017/0294061 A1 | 10/2017 | Shin et al. | |
| 2017/0372431 A1* | 12/2017 | Perl | G07C 5/008 |
| 2018/0062996 A1* | 3/2018 | Lei | H04L 45/745 |
| 2018/0351941 A1* | 12/2018 | Chhabra | H04L 63/08 |
| 2019/0082377 A1* | 3/2019 | Silver | G08G 1/161 |
| 2019/0299932 A1* | 10/2019 | Porteret | G07C 9/00563 |
| 2020/0113015 A1* | 4/2020 | Basu Mallick | H04W 48/18 |

FOREIGN PATENT DOCUMENTS

| | | |
|---|---|---|
| JP | 2007-207036 | 8/2007 |
| JP | 2009-169486 | 7/2009 |

OTHER PUBLICATIONS

The extended European Search Report issued for European Patent Application No. 18873138.4, Oct. 25, 2021, 9 pages.
Search Report issued for Singaporean Patent Application No. 11202011118T, dated Sep. 23, 2022, 2 pages.
Examination Report issued in corresponding Indian Patent Application No. 202047048218, Jul. 12, 2021, 6 pages.

\* cited by examiner (a)
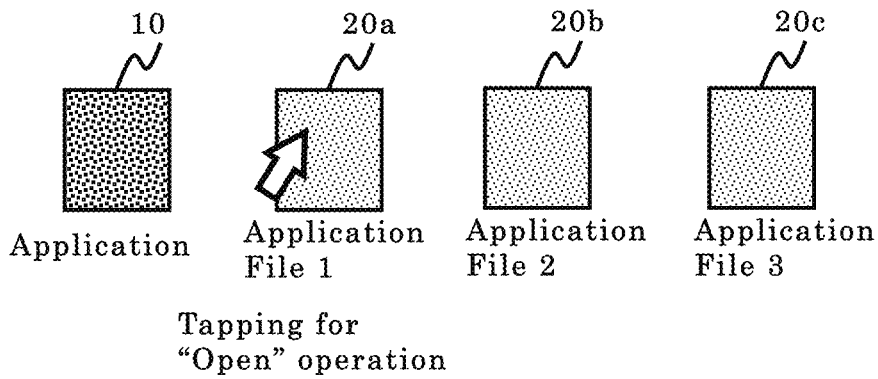
(b)
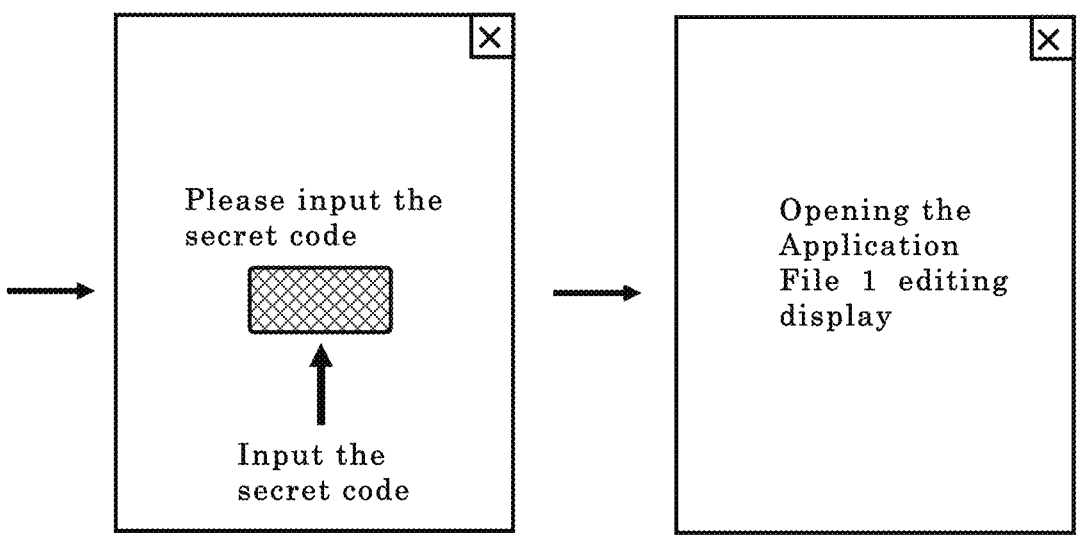
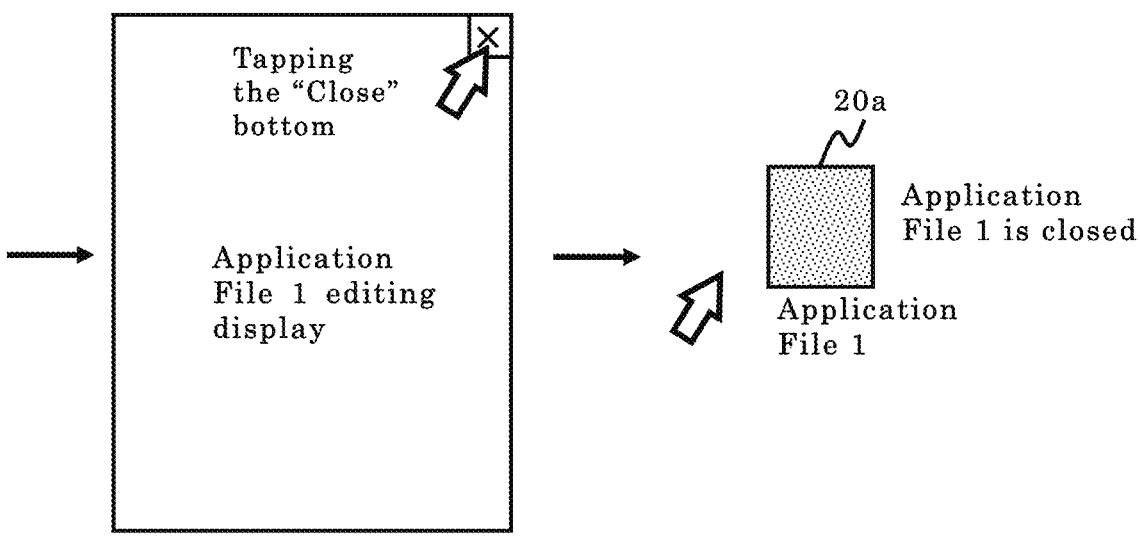
Fig.21

VEHICLE USE ASSISTANCE SYSTEM AND A VEHICLE USE ASSISTANCE METHOD

TECHNICAL FIELD

This invention relates to a vehicle use support system using a user portable terminal equipped with a vehicle use support application for supporting the use of a vehicle.

Vehicles to be applicable for this vehicle support system of the present invention includes an engine car equipped with a gasoline engine, an electric vehicle equipped with a motor and a hybrid vehicle equipped with both a gasoline engine and motor from the view point of driving device; and includes a normal vehicle, a mini type vehicle, a normal cargo vehicle, a small cargo vehicle, a taxi vehicle, a rental vehicle, a special purpose vehicle and a bus from the view point of vehicle type classification.

BACKGROUND ART

Vehicles, such as automobiles, have advanced intelligibility.

For example, a keyless system for operating a door lock and a door unlock by a door opening/closing control device is equipped even if a key is not inserted into a keyhole in a vehicle.

In this keyless system for a vehicle, it is necessary to carry an electronic key capable of wireless signal transmission for operating a door lock/unlock by a user. Wireless signal transmission/reception is performed between an electronic key and a door opening/closing control device mounted on a vehicle, and when both codes match with each other, door lock/unlock is performed.

This conventional keyless system performs wireless signal transmission and reception only by approaching or moving away from a car by the driver who owns the electronic key, and the door lock/unlock is automatically performed. In the same way, the engine is started only by depressing the engine switch while the electronic key is carried by the driver.

One problem in the conventional technology for a popular vehicle keyless system is that the electronic key must be carried on the body when the operating the vehicle. Since it is not necessary to insert the electronic key into a keyhole like a conventional physical key, the driver often puts the electronic key into a pocket of clothes or a bag. As a result, the driver tends to forget to carry the portable electronic key device. The portable electronic key device may be lost. It is difficult to notice the loss or stealing of the device. When the portable electronic key device is lost, the door lock/unlock and engine start cannot be performed. Therefore, when the portable electronic key device is lost, the driver should search for it, and such a situation leads to the risk of theft of the vehicle.

A conventional technology for controlling door lock/unlock by using a user portable terminal such as a cellular phone or a smartphone is also provided. However, the wireless signal communication used in such conventional portable terminal is different from the standard wireless signal communication (such as an LF wave or UHF waves) adopted for the portable electronic key device of the keyless system employed by the vehicle. It is not possible to perform a conventional door opening/closing control mounted on the vehicle. Therefore, another special vehicle device capable of wireless signal communicating with a user portable terminal such as a smartphone is required.

In order to solve the problem of a wireless signal transmission standard, as shown in FIG. 20, a technique is known for mounting an on-vehicle wireless communication device (21) called "DCM (Data Communication Module)" on the vehicle (14). DCM provides a capability for communicating with a mobile phone (12) by providing an ID code of an electronic key of a smart key system to the mobile phone (12).

For example, if the mobile phone (12) is equipped with a Near Field Communication (NFC) function, an NFC tag called a "smart tag" is provided. "smart tag" can perform communication by switching the mode of the smartphone to NFC mode. Predetermined data can be written in the NFC tag, and it is possible to interlock with the door opening/closing control device via the NFC tag only by bringing the smartphone near the NFC tag installed in the vehicle when the driver gets on the vehicle.

Prior art 1: JP 2001-241229

DISCLOSURE OF THE INVENTION

The Problems to be Solved

In addition to the automatic door opening/closing as described above, intelligent processing is advanced in various scenes such as automatic engine start or motor start, car navigation, and automatic driving system. However, there are problems to be solved even the vehicle get intelligent.

For example, the keyless system in the vehicle using the electronic key, the locking operation and the unlocking operation by the actuator are executed electronically instead of the conventional key into the conventional keyhole for turning key, and such conventional electronic operation is only a single function, there is no further intelligence function in the above-mentioned conventional electronic operation.

While the vehicle system technology is developed, a various vehicle system such as a keyless system, an engine automatic start or a motor automatic start system, a navigation system, an automatic air conditioning control system, and an automatic driving system are mounted. These systems are provided independently in the present, but it is expected that these systems are to be integrated in the future.

The processing regarding the vehicle function such as the door lock/unlock processing, the automatic driving processing, the accounting processing for using ETC (Electronic Toll Collection System), the car navigation processing, and the utilizing process of an artificial intelligence system equipped with an interactive recognition interface can be taken as part of the computer processing. Therefore, the vehicle is started to be fused with the computer system.

There is a problem of how to integrate these functions of the vehicles with the computer processing.

When the functions of the vehicle are integrated as part of computer processing, security measures also become important.

For example, the vehicle keyless system in the prior art can unlock/lock the door with the electronic key device by the person who carries the electronic key device as the authorized person in the same way as a conventional physical key. When the electronic key is lost or stolen, the unauthorized other person can illegally drive and steal the vehicle. This is a problem in that the owner of the vehicle is not associated with the true personal information of the authorized user.

When fusion with the vehicle processing and the computer processing progresses, the security level required for the vehicle processing the same as that of the general computer. In the case of the vehicle processing, the present security level is insufficient to input only the ID information from the electronic key device.

In the conventional vehicle, once ID information is inputted from the electronic key device, the door is unlocked, the engine or the motor can be started with the electronic key device. Therefore, when the door is unlocked by the loss or theft of the electronic key device, the vehicle processing is freely utilized by the unauthorized person.

In the conventional technology for utilizing the vehicle processing, the input of information based on various security levels is requested in order to confirm whether or not the person who tries to access the door is an authorized person. However, once the authentication of the authority of the door unlock is successful at the start of use, it is assumed that the user can use the vehicle as an authorized user, and the security setting is not performed furthermore in the prior art.

FIG. 21 is a schematic view showing the operation of the general application for starting and opening the application file, using, then closing. It is an example showing the typical operation for opening and closing the application file.

As shown in FIG. 21 (a), application 10 is installed to the computer system. When the user starts to use the application 10, the user selects the icon of the application 10 displaying onto the monitor with the pointing device such as a mouse. With the user input application file open command by the double click operation, the application 10 is started.

In this case, several application files such as 20a, 20b, 20c that can be operated by the application 10 are installed to the computer system, and the corresponding icons are displayed on the monitor. The user selects the icon of the application file 20 by the pointing device such as a mouse and conducts the double click operation, and the selected application file 20 is opened by the application 10. The application file 20 is opened by the application 10 to be operable, and current data contents are displayed onto the monitor.

If the application file 20 has a security measure for requesting password input, a password input column pops-up for confirming the use authority as shown in the upper figure of FIG. 21 (b). As shown above, password input may be requested if the user starts application 10 and opens application file 20 for operating in the prior art. If higher security is combined, the input of the identification information from IC card and the input of the biological information are requested besides the password input.

As shown in the upper figure of FIG. 21 (b), if the user inputs requested password and code information for opening the application file 20 via keyboard or other input devices, and the authentication process is identified successfully to fulfill the requested security level, the application file 20 is opened normally.

However, as shown in the lower figure of FIG. 21 (b), when the user finishes the desired operation through the application file 20, the user can simply close the application file 20 by pushing the command button or the pull-down menu such as "End button" and "Close button" by the pointing device such as mouse. The application 10 and the application file 20 are simply finished and closed normally.

The conventional application 10 does not request any input for special password and ID information when closing the application file 20. The conventional application 10 finishes simply and closes the application file 20 simply.

As shown above, when accessing the application file 20, various information input is requested according to the employed security level for confirming the authentication of the user at the opening of the application file 20. However, once the authentication check is conducted at the opening event, it is assumed that the right person who satisfied authentication keeps on using under his authentication, and the finishing operation and closing operation of the application file 20 is conducted under his authentication. Therefore, the conventional application 10 does not request any special input of the password and ID information at the closing operation of the application file 20 in the prior art.

However, in the case of an application and an application file for handling the vehicle processing, the security setting of approval, determination, and recording of data contents generated by the use of the vehicle can be required even at the end of vehicle driving.

In view of the above-described problems, it is an object of the present invention to provide a vehicle processing fused with the computer processing through the concept of an organized vehicle use support application and a vehicle use support application file. Also, it is an object of the present invention to provide security settings for operations on the vehicle use support system file for approval, determination, and recording of data contents generated by the use of the vehicle can be required even at the end of vehicle driving.

Means for Solving the Problems

In order to achieve the above-mentioned object, a vehicle use support system comprises: a vehicle use support application program available in a computer system for operating various functions installed in the vehicle; a vehicle use support application file which includes an open secret code for opening each vehicle use support application file by a vehicle use support application program and a close secret code for closing each vehicle use support application file from operable state to inoperable state by the vehicle use support application program; a code input means; an application file open function that performs authentication between an input code and the open secret code and opens the vehicle use support application file to be an operable state under the condition that the input code is matched with the open secret code; an application file close function that performs authentication between an input code and the close secret code and closes the opened operable state vehicle use support application file under the condition that the input code is matched with the close secret code.

By this configuration, the various vehicle modules can be operable as a computer process through the vehicle use support application program and vehicle use support application file. The security is provided for operation to the vehicle use support application file by not only setting the open secret code for opening the vehicle use support application file in an operable state but also setting the close secret code for closing the vehicle use support application file from the operable state to inoperable state.

Next, it is preferable that the vehicle use support application program comprises: an application file data output function for outputting data to a various vehicle modules installed in the vehicle for executing a prescribed function according to input data or recorded data in the vehicle use support application file; an application file data edit function that accepts and performs the data editing operation or data recording operation for data according to the driving performance or parking performance; an application file data saving function that saves the data obtained by the data editing operation or the data recording operation stored in the vehicle use support application file.

By this configuration, the various vehicle modules can be operable as a computer process through the vehicle use support application program and vehicle use support application file.

It is preferable that the application file close function performs a step for approving the data generated and obtained in the driving performance or parking performance obtained and recorded in the vehicle use support application file and a step for saving the approved data and a step for closing the opened operable state vehicle use support application file in inoperable state.

By this configuration, the driving or parking related data generated in the various vehicle modules can be obtained as a computer process through the vehicle use support application file by approving, confirming, and saving by the user input the close secret code. Afterward, driving or parking related data can be used as a big data for driving management, charge management, learning management for the artificial intelligence system, or reused in another traffic system or cooperating with insurance service.

The various vehicle modules installed in the vehicle can include a door locking/unlocking function module, an engine or a motor control function module, a car navigation system, an automatic driving system, a charging processing system, an artificial intelligence system, an illumination air conditioning system, an audiovisual equipment control system, or a combination thereof.

The configuration and installation of the vehicle use support system has several patterns.

The first pattern is that the vehicle use support application program and the vehicle use support application file are installed in the vehicle, and the code input device is installed to a part of vehicle portion accessible from the outside. The installation portion of the code input device is not limited. For example, the installation portion is at the side surface of the door or fender.

As the code input device, a keyboard or numpad can be employed if the open secret code or close secret code is a password. If the open secret code or close secret code is the biological information, a biological information input device such as fingerprint reader, vein pattern reader, a camera for face authentication, an iris pattern reader, a voice input device and so on can be used.

By this first pattern configuration, the user can access the code input device by touching from the outside, the vehicle use support application program is automatically activated or the vehicle use support application program in the sleep state is automatically re-activated. Further, the vehicle use support application file is opened and the control of the various vehicle modules installed in the vehicle can be started or re-started on the condition that the input code which the user inputs is matched with the open secret code.

If the open secret code or close secret code is the biological information, the code input method is not limited. For example, the biological information is a fingerprint pattern information, this fingerprint pattern information can include fingerprint image data of the corresponding finger scanned by the fingerprint reader and the scan direction data indicating the sliding direction on the fingerprint reader. If there is the scan direction information, the plural secret codes can be inputted by the same finger (For example, the righthand thumb) by varying the scan direction. For example, when inputting the open secret code, the thumb is put from the joint side to the fingerprint reader and the thumb is slid from the joint side to the fingertip side as it is, the scanned data is treated as the open secret code, and when inputting the close secret code, the same thumb is put from the finger tip side to the fingerprint reader and the thumb is slid from the fingertip side to the joint side as it is, the scanned data is treated as the close secret code. The variation of the scanning direction is considered to include not only the vertical direction of the finger but also the right and left direction, the oblique direction or skew direction, etc. By this way, the number of code information which can be inputted by one finger is increased.

The second pattern is that the vehicle use support application program and the vehicle use support application file are installed in the vehicle, and the code input device is installed to a part of vehicle portion inside of the vehicle and the door locking/unlocking function module can be operable by the electric key by a user. The installation portion of the code input device is not limited. For example, the code input device is installed to the housing or monitor of the car navigation system.

By this second pattern, the user can access the code input device after opening the door by the electric key and getting in the vehicle seat, and the vehicle use support application program is automatically activated or the vehicle use support application program in the sleep state is automatically re-activated. Further, the vehicle use support application file is opened and the control of the various vehicle modules installed in the vehicle in addition to the door lock/unlock module can be started or re-started on the condition that the input code which the user inputs is matched with the open secret code.

The third pattern is that the vehicle use support application program and the vehicle use support application file are installed in a user portable device, and a vehicle mounted unit which can transmit the data between the user portable terminal and the various vehicle modules is installed in the vehicle. For example, the input device on the user portable terminal is used as the code input device. The vehicle mount unit has a communication function conforming to the communication standard of the portable terminal and can exchange data with the portable terminal.

By this third pattern, the vehicle use support application program is automatically activated or the vehicle use support application program in the sleep state is automatically re-activated when the user accesses the code input device installed in the user portable terminal, further, the vehicle use support application file is opened and the control of the various vehicle modules installed in the vehicle via the vehicle mounted unit can be started or re-started on the condition that the input code which the user inputs is matched with the open secret code.

Next, the operation flows are described.

The configuration and installation of the vehicle use support system is the first pattern or the third pattern, the user accesses the code input device and inputs the open secret code, the vehicle use support application program is activated, and the vehicle use support application file is opened to be an operable state. The operation instruction data to the door locking/unlocking function module for unlocking the door lock is written in the vehicle use support application file, and the door is opened according to this instruction.

When the configuration and installation of the vehicle use support system is the second pattern, the user opens the door lock by using the electric key and gets in the vehicle and accesses the code input device installed to a part (such as the housing or monitor) of the car navigation system.

Next, the operation instruction data to the engine or motor control function module for starting the engine or monitor is written in the vehicle use support application file, and the vehicle use support application program output this engine or motor starting operation instruction data to the engine or motor control function module.

Further, other operation instruction data to other modules such as the automatic driving system, the car navigation system, the artificial intelligence system, the charging processing system, the air-conditioning system, and the audio-visual equipment control module are written in the vehicle use support application file, and these modules become active and the necessary functions are provided.

For example, the vehicle use support application outputs the automatic driving instruction data inputted dynamically by the data editing operation via the application file data edit function or selected from the past the automatic driving instruction data to the automatic driving system by the application file data transferring function function. For example, data necessary for automatic driving such as a destination, a traveling route to be selected, a desired arrival time, a drop by destination, a permission of use of a toll road, etc. can be given in the file data transfer from the vehicle use support application file by the application file data transfer function.

At last, it is preferable that the application file close function performs a step for approving the data generated and obtained in the driving performance or parking performance obtained and recorded in the vehicle use support application file and a step for saving the approved data and a step for closing the opened operable state vehicle use support application file in an inoperable state.

The external systems cooperating with the charging processing system include any one of a toll road charging system, a parking lot charging system, a rental car charging system, a car sharing charging system, or a combination thereof.

At last, it is preferable that the application file close function performs a step for approving the charging data generated and obtained in the driving performance or parking performance obtained and recorded in the vehicle use support application file and a step for saving the approved charging data and a step for closing the opened operable state vehicle use support application file in inoperable state.

Next, the temporarily parking operation when the vehicle is temporarily parked at the drop by destination is described.

There is often a temporary parking during driving. In recent years, a vehicle with a so-called automatic idling stop mechanism for stopping an engine or a motor even in a short period of time for a signal stop has become widespread, but when the engine or the motor is stopped by the signal, of course the whole function of the vehicle is not stopped. When the stepping of the brake pedal is removed or the accelerator pedal is depressed, the engine is restarted, while the other control system keeps on operating. In the present invention, such stopping operation during driving is not included in "the temporarily parking operation". In the present invention, "temporarily parking operation" is stopped by entering the parking lot or stopping on a road shoulder, and the temporary parking is performed when the user temporarily gets out and away from the vehicle. In this way, the situation in which the user is temporarily away from the vehicle is for a variety of purposes such as a rest, a meal, shopping, a business meeting, and the like, and the parking time is diversified.

The vehicle use support application file includes a sleep secret code for shifting the status of the vehicle use support application file from active status to sleep status by the vehicle use support application program and a restart secret code for shifting the status of the vehicle use support application file from sleep status to active status by the vehicle use support application program in addition to the open secret code and the close secret code. The vehicle use support application program further comprises; an application file sleep function that performs authentication between an input code and the sleep secret code and shifts the opened vehicle use support application file from operable state to sleep state under the condition that the input code is matched with the sleep secret code; and an application file restart function that performs authentication between an input code and the restart secret code and re-opens the vehicle use support application file to be an operable state under the condition that the input code is matched with the restart secret code.

With the above configuration, even when the vehicle shifts to temporarily parking state and the vehicle function shifts to temporarily sleep state, the vehicle use support application does not lose the entire process for controlling the various functions of the vehicle on the basis of the data described in the vehicle use support application file, and can be restarted seamlessly.

Next, the vehicle use support system for enhancing the security for preventing unauthorized access to the vehicle is described. For example, the system employing the portable terminal held by the user is described here.

In the vehicle use support system wherein the user portable terminal includes a remote-control application program for controlling the vehicle use support application program, the vehicle use support application program performs: a request information data transfer step for transferring request information to the remote-control application program for requesting approval of the restart of the various vehicle modules including the engine or motor control function module when the vehicle use support application program restarts from the sleep state by the access via the code input device or when the door locking/unlocking function module can be operable by the electric key; a various vehicle modules locking step for locking the various vehicle modules including the engine or a motor control function module until the approve of the restart of the various vehicle modules; and a various vehicle modules unlocking step for unlocking the various vehicle modules by receiving the approval of the restart of the various vehicle modules from the remote-control application program; wherein the user can set the vehicle use support application program to lock the various vehicle modules and send the transferring request information to the remote-control application program and unlock the various vehicle modules via the remote-control application program.

Thus, when there is an access to the vehicle, a mechanism capable of notifying the designated portable terminal of the user can be provided, and the operation of the various functions of the vehicle can be prevented without approving the operation of various functions of the vehicle as illegal access if there is a notification of access that is not recognized by the user.

Here, the user portable terminal may be a portable telephone, a smartphone, a tablet computer, a personal computer, and a computer resource capable of being carried by the user such as a smart watch.

Next, the vehicle use support system for expanding to the sharing vehicle is described. The vehicle is used independently of each other by a plurality of persons such as car sharing use of the vehicle with a family or acquaintance, car sharing use, and rental car utilization.

In order to satisfy this condition, each of the vehicle use support application files is collected in a personal folder for each user. Each personal folder includes a personal folder open secret code for opening the personal folder in an operable state by the vehicle use support application program and a personal folder close secret code for closing the open state personal folder opened to be an inoperable state.

According to the above configuration, since the vehicle use support application files are collected in the individual folder by the individual unit by the user, the use state of the vehicle or the like can be individually arranged in the user unit and managed and controlled.

Then, the open secret code and the close secret code usable in the vehicle use support system of the present invention can be, for example, a personal identification number consisting of a numeral, and a password code including an alphabet letter. Regarding biological information of the user, various individual biological information such as a fingerprint pattern, a vein pattern, an iris pattern, and a voiceprint pattern can be employed.

The vehicle use support system of the present invention is not limited as to the vehicle type. In the classification of the drive device, there are an engine automobile mounted with an engine, an electric vehicle equipped with a motor, and a hybrid vehicle equipped with an engine and a motor. In the vehicle classification, a normal vehicle, a light vehicle, a normal cargo vehicle, a light cargo vehicle, a small cargo vehicle, a rental customer vehicle, a special vehicle, a bus vehicle, and the like are provided.

Next, as a variation, an open secret code for opening the vehicle use support application and a close secret code for closing the open vehicle use support application can be set in the vehicle use support application program instead of setting in the vehicle use support application file.

In this case, the open secret code for opening each vehicle use support application file and the close secret code for closing each vehicle use support application file are included in the vehicle use support application program instead, and not included in the vehicle use support application file. The vehicle use support application is configured to have: an application file open function that performs authentication between an input code and the open secret code and opens the vehicle use support application file to be operable under the condition that the input code is matched with the open secret code; an application file close function that performs authentication between an input code and the close secret code and closes the vehicle use support application file from operable state to inoperable state under the condition that the input code is matched with the close secret code.

A method for controlling vehicle use support system available in a computer system for operating a vehicle use support application file by a vehicle use support application program, comprises: including an open secret code for opening each vehicle use support application file by a vehicle use support application program and a close secret code for closing each vehicle use support application file from operable state to inoperable state by the vehicle use support application program in the vehicle use support application file; including an application file open function that performs authentication between an input code and the open secret code and opens the vehicle use support application file to be in an operable state under the condition that the input code is matched with the open secret code in the vehicle use support application program; and including an application file close function that performs authentication between an input code and the close secret code and closes the opened operable state vehicle use support application file under the condition that the input code is matched with the close secret code in the vehicle use support application program.

Next, as a variation method, an open secret code for opening the vehicle use support application and a close secret code for closing the open vehicle use support application can be set in the vehicle use support application program instead of setting in the vehicle use support application file.

The open secret code for opening each vehicle use support application file and the close secret code for closing each vehicle use support application file are included in the vehicle use support application program, and not included in the vehicle use support application file.

The application file open function performs authentication between an input code and the open secret code and opens the vehicle use support application file to be an operable state under the condition that the input code is matched with the open secret code; and the application file close function performs authentication between an input code and the close secret code and closes the vehicle use support application file from operable state to inoperable state under the condition that the input code is matched with the close secret code.

BRIEF DESCRIPTION OF THE DRAWINGS

FIG. 21 is a schematic view showing an operation for starting a prior application to open a prior application file, and then ending and closing the prior application file in the prior art.

DETAILED DESCRIPTION OF THE PREFERRED EMBODIMENT

Some embodiments of a vehicle use support system according to the present invention are described below with reference to the relevant drawing. Needless to add, the claims of the present invention include but are not limited to the application, configuration, or quantity shown in the following embodiments.

Hereinafter, the example of the vehicle employing the vehicle use support system is not limited. The vehicle may be an engine car, an electric car quipped with motor or a hybrid car equipped with both an engine and a motor mounted thereon.

Embodiment 1

The vehicle use support system of the present invention of Embodiment 1 is described.

The vehicle use support system of Example 1 is the first pattern, and a vehicle use support application and a vehicle use support application file are provided in a vehicle, and a configuration example in which a code input means can be accessed from the outside is described. The portion where the vehicle use support application and the vehicle use support application file is installed is not limited, but for example, these may be a part of an application and an application file stored in a car navigation system, an automatic driving system, or an artificial intelligence system. The information presentation and guidance to the user can be performed through the monitor of the car navigation system.

Figure 1:
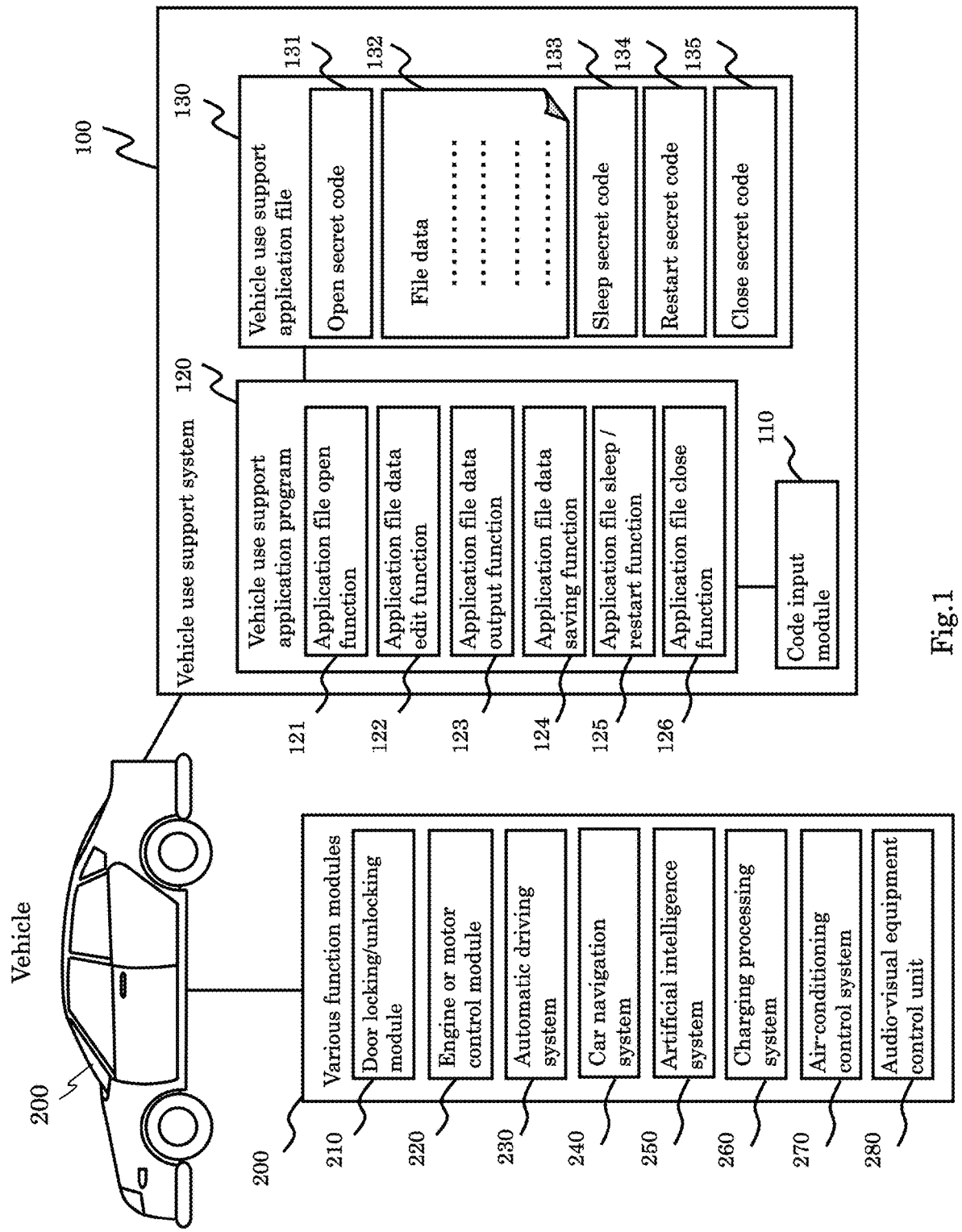
FIG. 1 is a schematic view of a configuration of a vehicle use support system 100 according to Embodiment 1.

FIG. 1 is a schematic view of a configuration of a vehicle use support system 100 according to Embodiment 1. The vehicle to be used may be an engine automobile, an electric car equipped with motor or a hybrid vehicle equipped with both of an engine and a motor mounted thereon. In addition to the vehicle use support system 100, the vehicle 200 and various functions 210-280 of the vehicle are also shown in FIG. 1. As various functions of the vehicle, a door locking/unlocking function 210, an engine or a motor control function 220, a car navigation system function 240, an automatic driving system function 230, an artificial intelligence system control function 250, a charging processing system function 260, an air-conditioning system control function 270 and an audio-visual equipment control function 280 are shown. However, other functions may be included in addition to the above-mentioned functions mounted on the vehicle.

A vehicle use support system 100 comprises a code input means 110, a vehicle use support application 120, and a vehicle use support application file 130.

Each of the components is described below.

The code input means 110 is a device for inputting an open secret code and a close secret code. The configuration of the device is different depending on the kind of an open secret code and a close secret code to be input. For example, when the open secret code and the close secret code is a password, there may be a keyboard. There may be ten keys if the number is only a numeral. When the open secret code and the close secret code are biological information, there may be a biological information reading sensor (fingerprint reader, a vein pattern reader, a camera for face authentication, an iris pattern reader, a voice input device, etc.).

As shown in FIG. 1, it is preferable that the code input means 110 is provided at a place accessible from the outside of the vehicle in a configuration in which the code input means 110 is mounted on the vehicle 200. The installation place is not limited. For example, the code input means 110 is installed in a door side surface or a fender part of a vehicle.

When the code input means 110 is mounted on a portable terminal such as a smartphone, an input device equipped with the portable terminal can be used. For example, some smartphones have a fingerprint reader, a camera, a microphone, etc. Furthermore, the portable terminal of a vein pattern reader or an iris pattern reader may be configured as a smartphone.

The vehicle use support application 120 is an application for assisting the use of the function of the vehicle. The vehicle use support application 120 has an application file open function 121, an application file data input/output function 122, an application file editing function 123, an application file storage function 124, an application file sleep/restart function 125, and an application file closing function 126.

An application file open function 121 receives an input of an open secret code inputted from a user via the code input means 110. An application file open function 121 performs authentication processing, and opens the vehicle use support application file 130. As will be described later, an open secret code is set in the vehicle use support application file 130, and authentication processing is performed by confirming the matching of the inputted open secret code via the code input means 110 and the open secret code set in the vehicle use support application file 130. When authentication is established, the vehicle use support application file 130 becomes an open state.

An application file editing function 122 dynamically inputs data to a file data part 132 of the vehicle use support application file 130, and dynamically records various data generated during traveling or parking in the vehicle use support application file 130. It also includes not only newly inputting data but also selecting and designating data inputted in the past and recorded.

The application file data output function 123 outputs the data inputted to the file data part 132 by the application file editing function 122 to various functions mounted on the vehicle 200. The functions of the vehicle 200 perform various functions on the basis of the given data. When the data recorded in the file data part 132 are described in the sequence order of execution to various functions of the vehicle 200, the data can be outputted to the corresponding functions according to the sequence. When the scheduled execution time is described, it is possible to output the corresponding functions when the execution time becomes the scheduled execution time.

The application file storage function 124 determines and records various data related to the current running or parking remaining in the file data part 132 to the vehicle use support application file 130 in the closing operation by the application file closing function 126 as described later. Thus, by determining and recording various data related to the current running or parking remaining in the file data part 132, the various management such as traveling recording management, charging processing management and running content learning function management as described later are made possible.

The application file sleep/restart function 125 suspends the control state of the various functions of the vehicle and the application file to be temporarily in sleep state when the travel is stopped and the car is parked for a while, and restarts the control state of the various functions of the application file when the travel is started again after parking until the travel process is completed.

The sleep secret code 133 and the restart secret code 134 are set in the vehicle use support application file 130. When the user inputs the sleep secret code 133 via the code input means 110, the vehicle use support application 120 automatically shifts the vehicle use support application file 130 and itself to the temporary sleep state. After that, when the user inputs the restart secret code 134 via the code input means 110, the vehicle use support application 120 automatically restarts and shifts the vehicle use support application file 130 and various vehicle functions in restart state from the sleep state.

The application file closing function 126 is a function performing authentication processing and normally ending and closing a vehicle use support application file 130 currently in an open state by receiving an input of a close secret code inputted from the user via the code input means 110. As will be described later, a close secret code is set in the vehicle use support application file 130, and the authentication processing is performed by confirming the matching of the inputted close secret code via the code input means 110 and the close secret code set in the vehicle use support application file 130. When authentication is established, the application file closing function is performed via the application file storage function 124. The recording of various data related to the current driving or parking recorded in the file data part 133 of the vehicle use support application file 130 is approved and confirmed, recorded through an application file storing function, and normally finished to be a closed state.

The various data relating to the vehicle driving can be made into integrated data as a result of the computer processing through the concept of the vehicle use support application file 130 by approving, determining, and recording the records of the various data related to the traveling or parking. Various management such as the traveling management, the charging processing management, the running content learning, etc. can be performed.

The vehicle use support application file 130 is an individual application file used in the vehicle use support application 120.

The vehicle use support application file 130 has an open secret code 131, a file data part 132, a sleep secret code 133, a restart secret code 134, and a close secret code 135.

An open secret code 131 is a secret code for opening the vehicle use support application file 130 by the vehicle use support application 120. The authentication processing is performed by the application file open function 121.

The file data part 132 is a part where data dynamically inputted to a vehicle use support application file 130 is stored. Data is inputted by the application file data editing function 122, and data is outputted by the application file data output function 123 to the various vehicle functions and data is determined and stored by an application file data storage function 124.

The sleep password code 133 is a secret code for making the vehicle use support application 120, the vehicle use support application file 130 and various function of the vehicle in a temporary sleep state.

The restart password code 134 is a secret code for resuming the vehicle use support application 120, the vehicle use support application file 130, and various functions of the vehicle from the temporary sleep state.

The close secret code 135 is a secret code for normally ending and closing a vehicle use support application file 130 by the vehicle use support application 120 when authentication processing by the application file closing function 126 is established.

These are the examples of each configuration of the vehicle use support system 100 according to the present invention.

Hereinafter, an example of control of various functions of the vehicle 200 by the vehicle use support system 100 will be described along with an example of a flow of operation.

Figure 4:
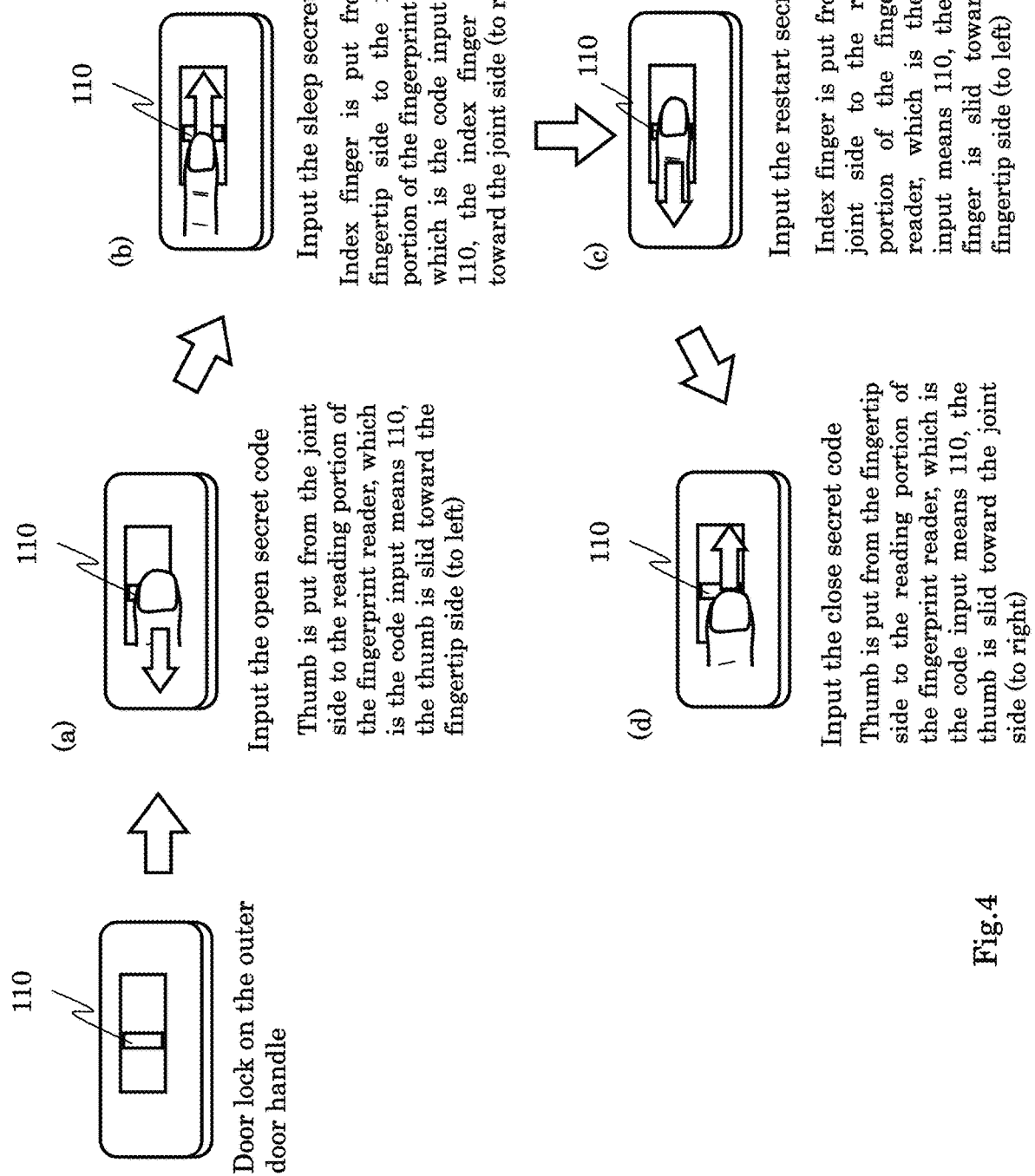
FIG. 4 is a schematic view showing the example of the input of the open secret code, the input of the close secret code, the input of the sleep secret code, and the input of the restart secret code.

In the following example, the open secret code and the close secret code are both the biological information of the fingerprint of the thumb, but both can be differentiated depending on the direction of the scan. For example, as shown in FIG. 4 (*a*), the thumb is put from the joint side to the reading portion of the fingerprint reader which is the code input means 110, and the thumb is slid toward the fingertip side as it is, and the open secret code is inputted by scanning the thumb (the thumb in the figure). On the contrary, as shown in FIG. 4 (*d*), the finger tip of the thumb is put to the reading portion of the fingerprint reader which is the code input means 110, the thumb is slid toward the joint side as it is, and the close secret code is inputted by scanning the thumb (the thumb in the figure).

The sampling of section image data of the fingerprint data read from the joint side to the fingertip side of the thumb is obtained as the open secret code by the code input means 110, and similarly, the sampling of the section image data of the fingerprint data read from the fingertip side to the joint side is obtained as the close secret code by the code input means 110. Although both of them become fingerprint image data of the same thumb image in the assembled result, these two secret codes can be distinguished by associating the scanned direction to the inputted thumb data. The same thumb image data can be distinguished by associating the scanned direction with whether the sampling order is from the joint side or from the fingertip side together with the fingerprint data. Here, data obtained by scanning the thumb with the pattern of FIG. 4 (*a*) is used as the open secret code, and data obtained by scanning the thumb with the pattern of FIG. 4 (*d*) is the close secret code.

Next, in this example, both the sleep secret code and the restart secret code are both the biological information of the fingerprint of the index finger. Similar to the case of the open secret code and the close secret code, both are made to be distinguished by the direction of the scan. For example, as shown in FIG. 4 (*b*), the index finger is put from the fingertip side to the reading portion of the fingerprint reader which is the code input means 110, the index finger is slid toward the joint side as it is, and the sleep secret code is inputted by scanning the index finger to the right in the drawing. On the contrary, as shown in FIG. 4 (*c*), the joint side of the index finger is put to the reading portion of the fingerprint reader which is the code input means 110, the index finger is slid toward the fingertip as it is, and the restart secret code is inputted by scanning the index finger to the left in the drawing.

The sampling of section image data of the fingerprint data read from the joint side to the fingertip side of the index finger is obtained as the sleep secret code by the code input means 110. The sampling of the section image data of the fingerprint data read from the fingertip side to the joint side is obtained as the restart secret code by the code input means 110. Although both of them become fingerprint image data of the same index finger image in the assembled result, these two secret codes can be distinguished by associating the scanned direction to the inputted index finger data. The same index finger image data can be distinguished by associating the scanned direction with whether the sampling order is from the joint side or from the fingertip side together with the fingerprint data. Here, data obtained by scanning the index finger with the pattern of FIG. 4 (*b*) is used as the sleep secret code, and data obtained by scanning the index finger with the pattern of FIG. 4 (*c*) is the restart secret code.

(1) Activation of the vehicle use support application 120

When the user uses the vehicle, the user accesses the code input means 110.

Figure 2:
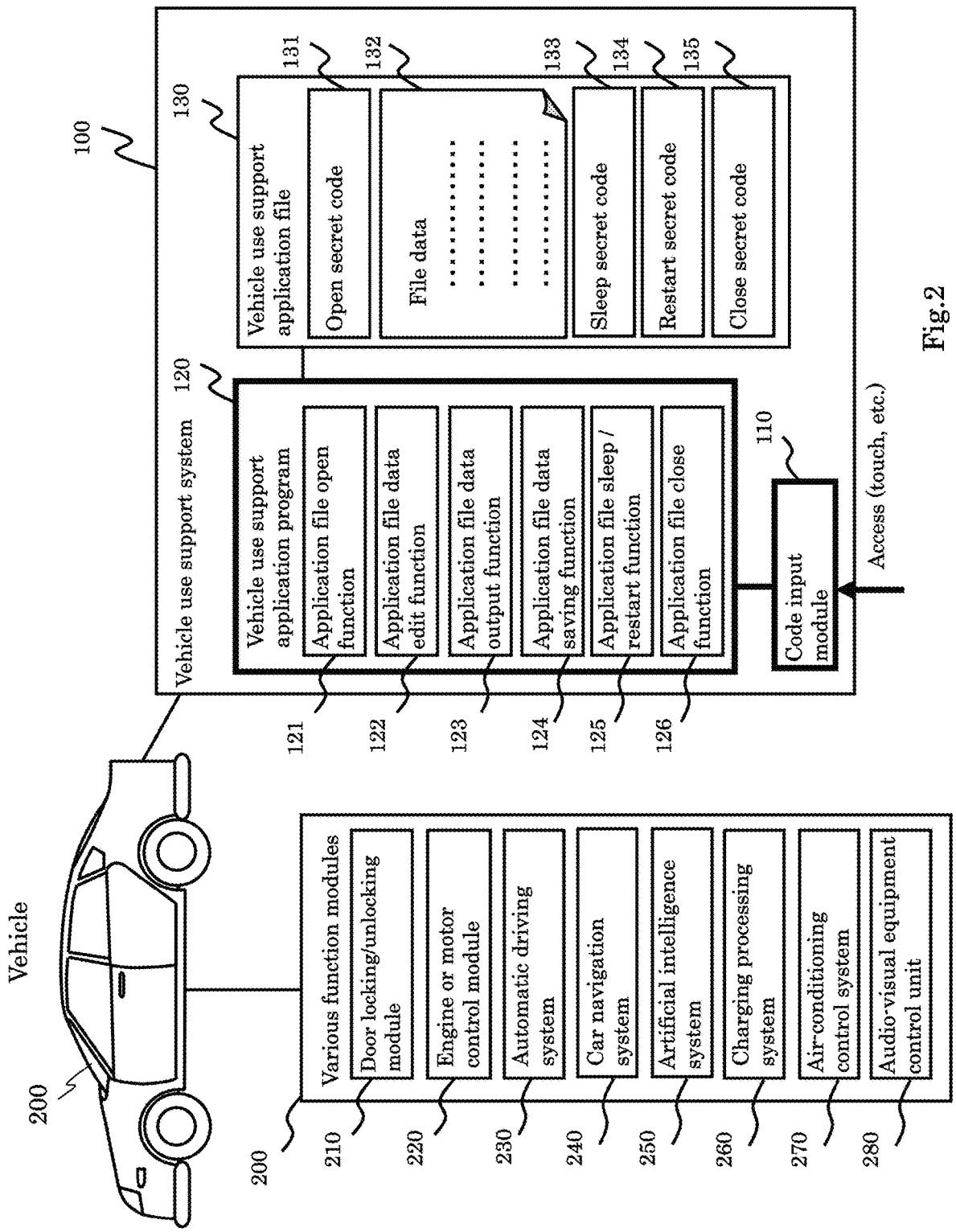
FIG. 2 is a schematic view showing a state in which a code input means 110 is accessed and a vehicle use support application 120 is started.

FIG. 2 is a schematic view showing a state in which the code input means 110 is accessed and the vehicle use support application 120 is activated and started.

For example, the code input means 110 provided on a side surface of a door of the vehicle is accessed by touching or the like. This touching can be regarded as part of a flow for inputting the open secret code, and it may be determined that the thumb has touched to the code input means 110. A function for detecting that the code input means 110 is accessed is provided, and the detected electric signal is inputted to the vehicle use support application 120 as the start signal and the vehicle use support application 120 is started automatically.

(2) Open of the vehicle use support application file 130

Subsequently, the user inputs the open secret code to the code input means 110.

Figure 3:
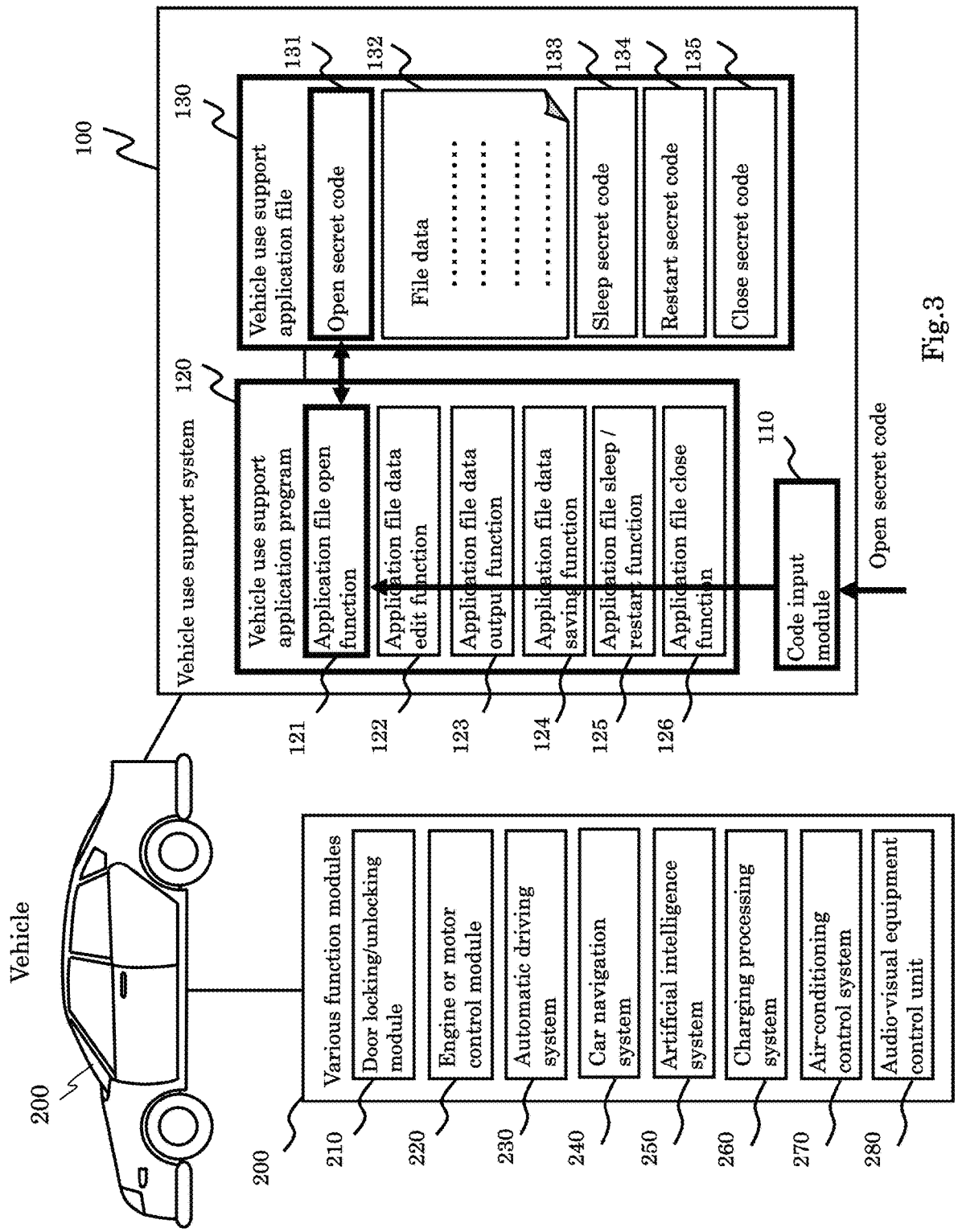
FIG. 3 is a schematic view showing the basic operation flow of open of the vehicle use support application file 130.

FIG. 3 is a schematic view showing the basic flow of open of the vehicle use support application file 130.

FIG. 4 is a schematic view showing the input of the example of the open secret code, the input of the close secret code, the input of the sleep secret code, and the input of the restart secret code.

In the example shown in FIG. 4, a reading portion of the fingerprint reader is provided on the surface of an outer handle of a driver's side door of the vehicle, and the open secret code is inputted by putting the thumb to the reading port of the fingerprint reader and slid the thumb from the joint side to the finger chip side. The vehicle use support application 120 authenticates the open secret code and when authentication is successful, the vehicle use support application file 130 is opened.

(3) Unlock of the door lock

Subsequently, the vehicle use support application 120 accesses the file data part 132 of the vehicle use support application file 130 by the application file data output function 123, and reads the written data in the vehicle use support application file 130, and outputs and develops the data to various functions of the vehicle 200.

Figure 5:
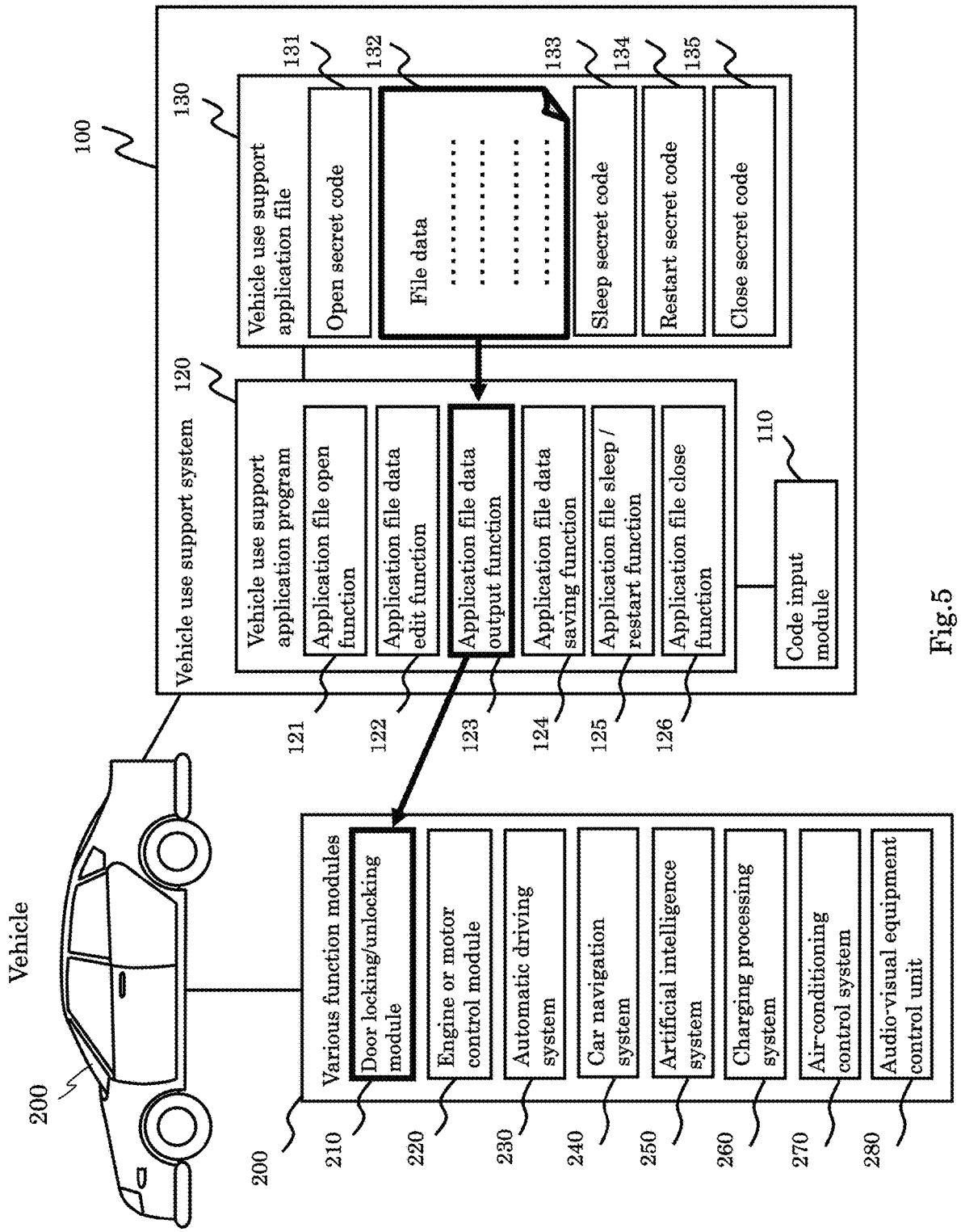
FIG. 5 is a schematic view showing the basic operation flow up to the door unlocking process.

FIG. 5 is a schematic view showing a basic flow up to the unlocking of the door easily.

In this case, first, data indicating a door unlock instruction to the door locking/unlocking function 210 is written in the vehicle use support application file 130. The door locking/unlocking function 210 releases the door lock according to the door unlock instruction.

(4) Activation of various functions of the vehicle before traveling of the vehicle The user opens the door and gets into the vehicle 200.

Figure 6:
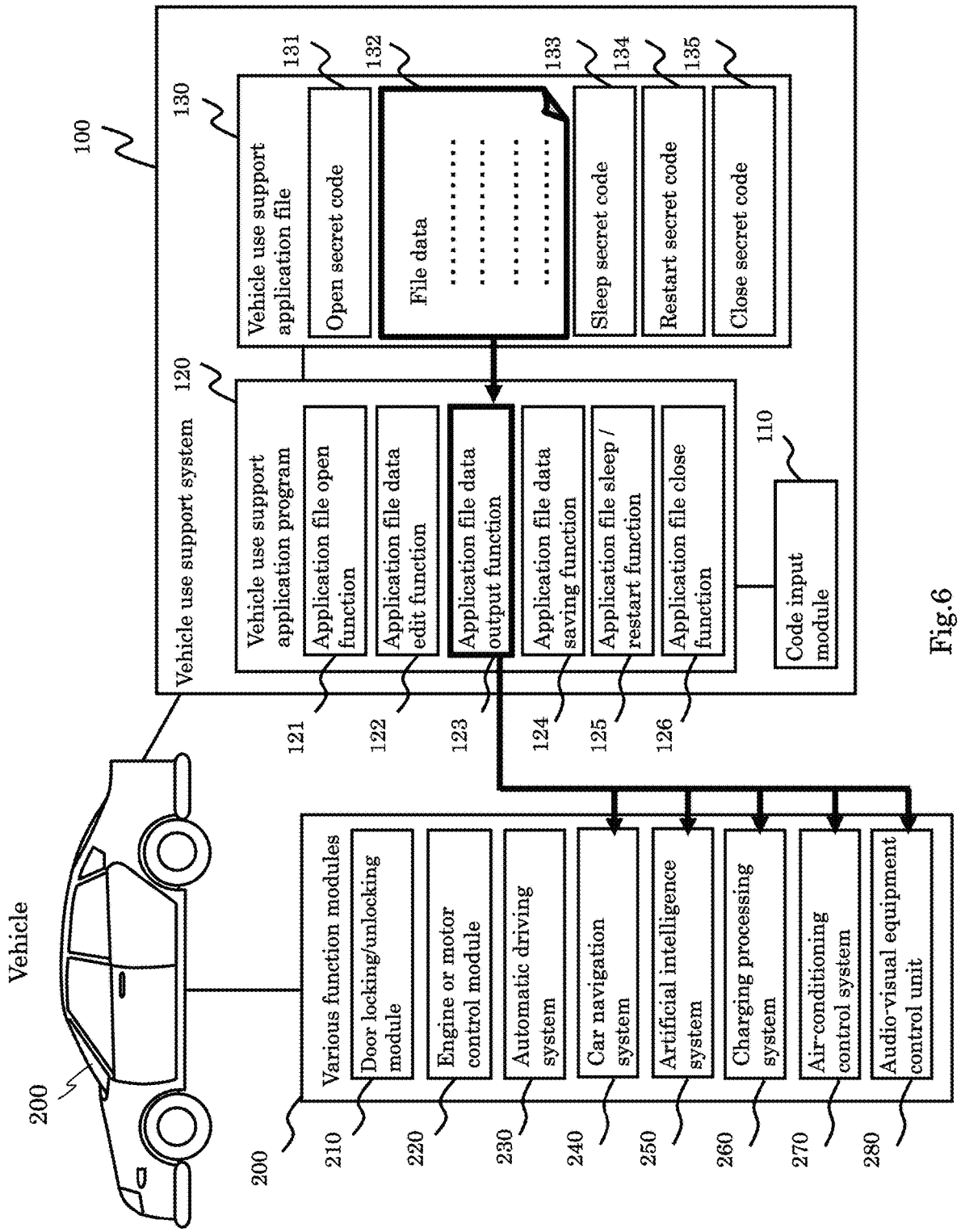
FIG. 6 is a schematic view showing the basic operation flow in which various functions of the vehicle 200 before driving start of the vehicle are activated.

FIG. 6 is a schematic view showing the basic operation flow in which various functions of the vehicle 200 before driving start of the vehicle are activated.

Subsequently, the vehicle use support application 120 accesses the file data part 132 of the vehicle use support application file 130 by the application file data output function 123, and reads the written data, and outputs and develops the data to various functions of the vehicle 200. The instruction sequence required for controlling various functions of the vehicle is written in the file data part 132.

Here, the car navigation system function 240, the artificial intelligence system control function 250, the charging processing system function 260, the air conditioning system control function 270 and the audiovisual equipment control function 280 are activated according to the instruction sequence written in the file data part 132.

The combined configuration can include the car navigation system function 240 and the artificial intelligence system control function 250. Further, these can be combined with the automatic driving system function 230.

The timing at which the charging processing system function 260 is started may not be this start timing depending on the situation of the traveling process. However, for example, when the rental car is used, the charging can be started at this timing of the start to use, so that the charging processing system function 260 is activated at this timing.

The various functions of the vehicle are controlled by the controller of the respective modules, and the vehicle use support application 120 may support the processing of the controller of each module by giving the target value or parameter of the control and monitoring the output value.

(5) Adjustment and change of a travel process and a travel content before traveling of the vehicle start It is necessary to adjust and change a travel process and a travel content before traveling of the vehicle start if the destination, the stop destination, the travel route, etc. are different in the previous traveling, although this procedure is not required when the same data already described in the file data part 132 of the vehicle use support application file 130 may remain.

Figure 7:
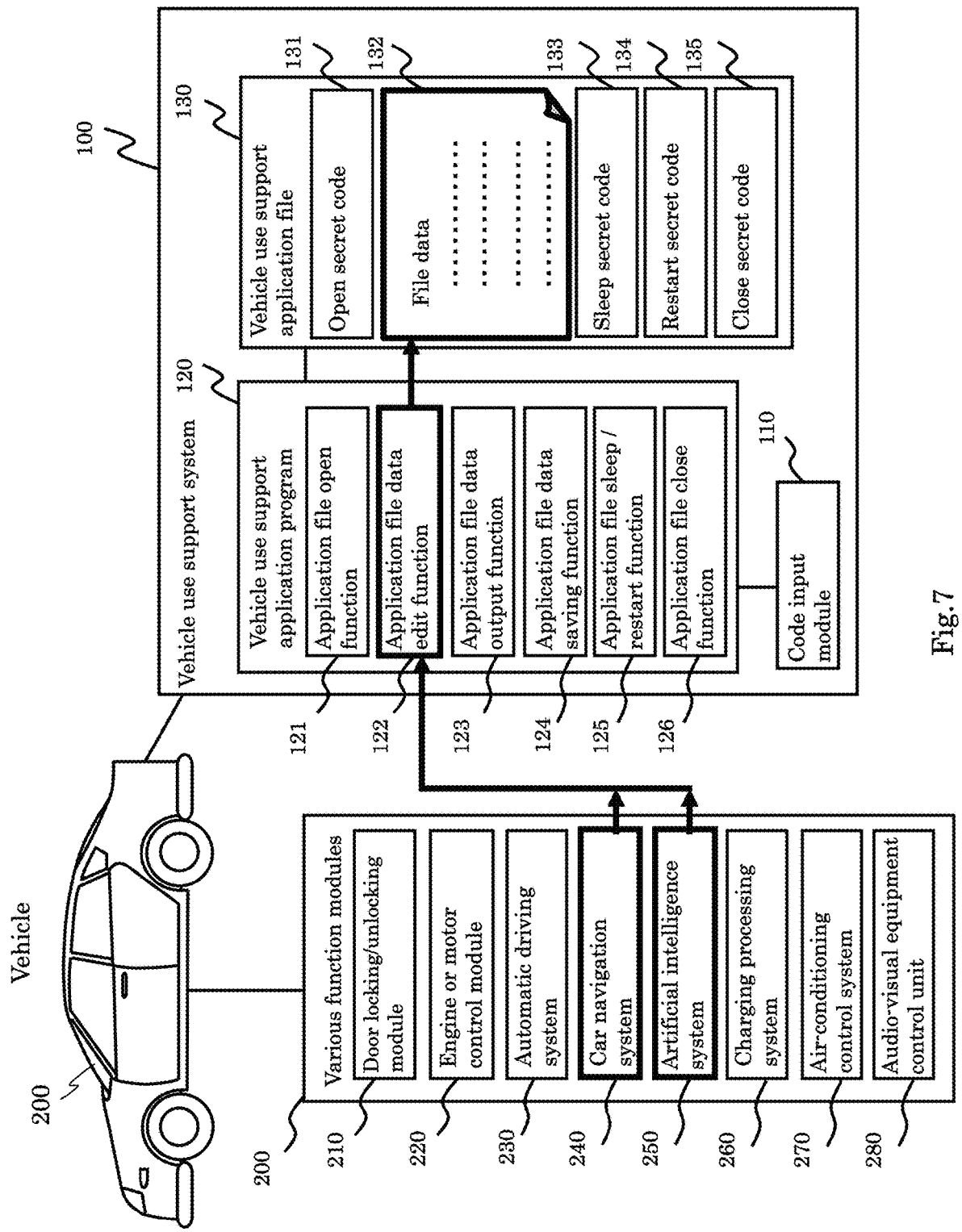
FIG. 7 is a schematic view showing the basic operation flow of the adjustment and change of the driving route and the driving content before the vehicle driving to start.

FIG. 7 is a schematic view showing the basic operation flow of the adjustment and change of the driving route and the driving content before the vehicle driving to start.

In this case, the file data part 132 is newly input and edited through the application file data editing function 122, or a part of the input data can be inputted by selecting the past input data, or a part of the input data may be additionally inputted and edited by the user. The application file data editing function 122 can input and edit the file data part 132 in cooperating with the car navigation system function 240 and the artificial intelligence system control function 250.

When the car navigation system function 240 or the artificial intelligence system control function 250 has a voice input/output function mounted thereon, the operation by user's voice through the input/output function can be performed. For example, the vehicle navigation system function 240 or the artificial intelligence system control function 250 inputs the outline of the travel process and the traveling content according to the voice input, the car navigation system function 240 and the artificial intelligence system control function 250 output the corresponding candidates by voice guidance. The user can also select the candidates by voice input.

Here, the route is set as the departure place is A, then driving through a general road, then using a toll road R1, returns to a general road, and parking a drop destination B, then using a toll road R2, then go to the final destination C is set as the travelling schedule.

(6) A vehicle traveling

The traveling of the vehicle 200 is started on the basis of the data described in the file data part 132 of the vehicle use support application file 130. In this case, automatic driving is performed by an automatic driving system function 230.

Figure 8:
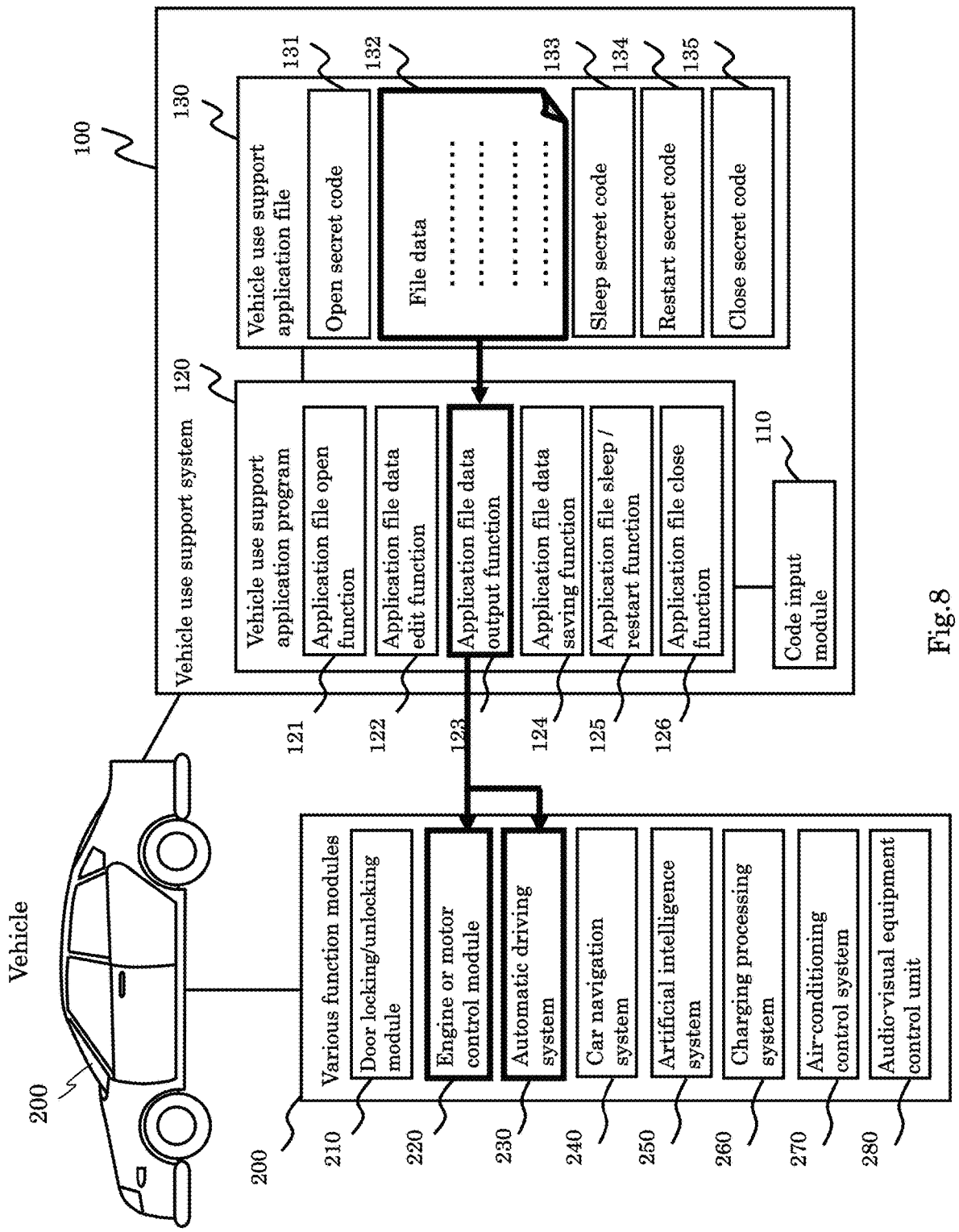
FIG. 8 is a schematic view showing the basic operation flow to start driving the vehicle.

FIG. 8 is a schematic view showing the basic operation flow to start driving the vehicle.

The application file data output function 123 reads engine start instruction data or motor start instruction data written in the file data part 132, outputs these data to the engine or the motor control function 220 and an automatic driving system function 230, and the automatic driving operation starts the engine or the motor. The automatic traveling operation has started.

When the automatic driving system function 230 is present, the engine or the motor control function 220 can be combined with it. In this case, the engine start instruction data or motor start instruction data written in the file data part 132 are given to the automatic driving system function 230.

When the automatic driving system function 230 is not mounted, the user himself/herself drives manually using vehicle parts such as a steering wheel, an accelerator, and a brake.

(7) A temporary parking shifting to the sleep state

The automatic traveling operation is advanced, and after a toll road R1 is used from the starting point A, it is returned to the general road to arrive at the parking place B to be parked. In this process, charging processing of the use charge of the toll road R1 is also performed. In this example, the parking lot is stored in the pay parking lot at the stop destination B, and the parking support function of the automatic driving system function 230 assists the parking operation in a desired parking space. The charging processing of the pay parking is started.

Here, the user gets out of the vehicle and temporarily goes away from the vehicle 200. In this case, it is necessary to close the door lock again, but since it is in the middle of the travel process, it is scheduled to restart, so that the vehicle 200 and the vehicle use support application 120 and the vehicle use support application file 130 are temporarily shifted into a sleep state.

Figure 9:
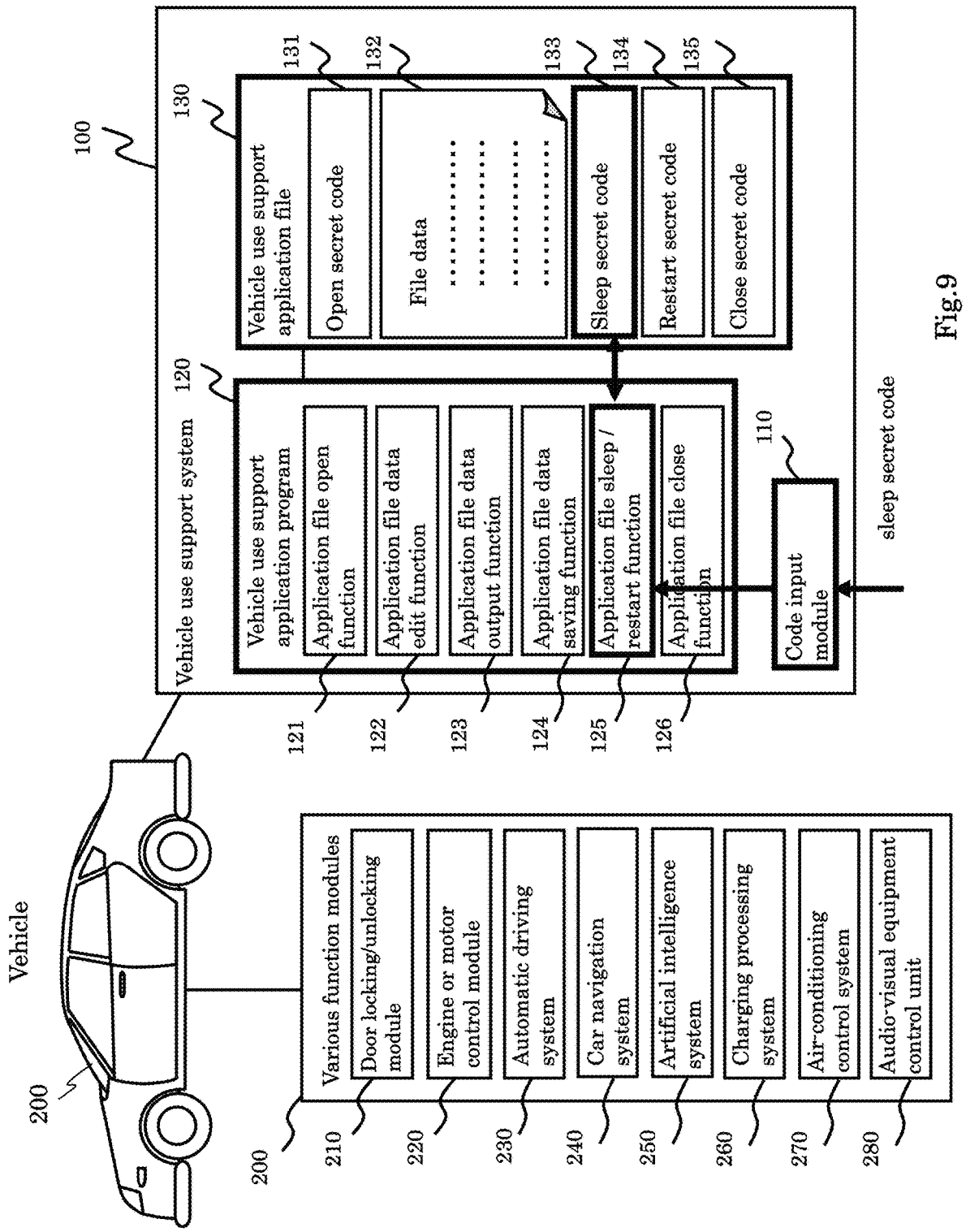
FIG. 9 is a schematic view showing the basic operation flow (1) in which various functions of the vehicle are in a sleep state by temporary parking.
Figure 10:
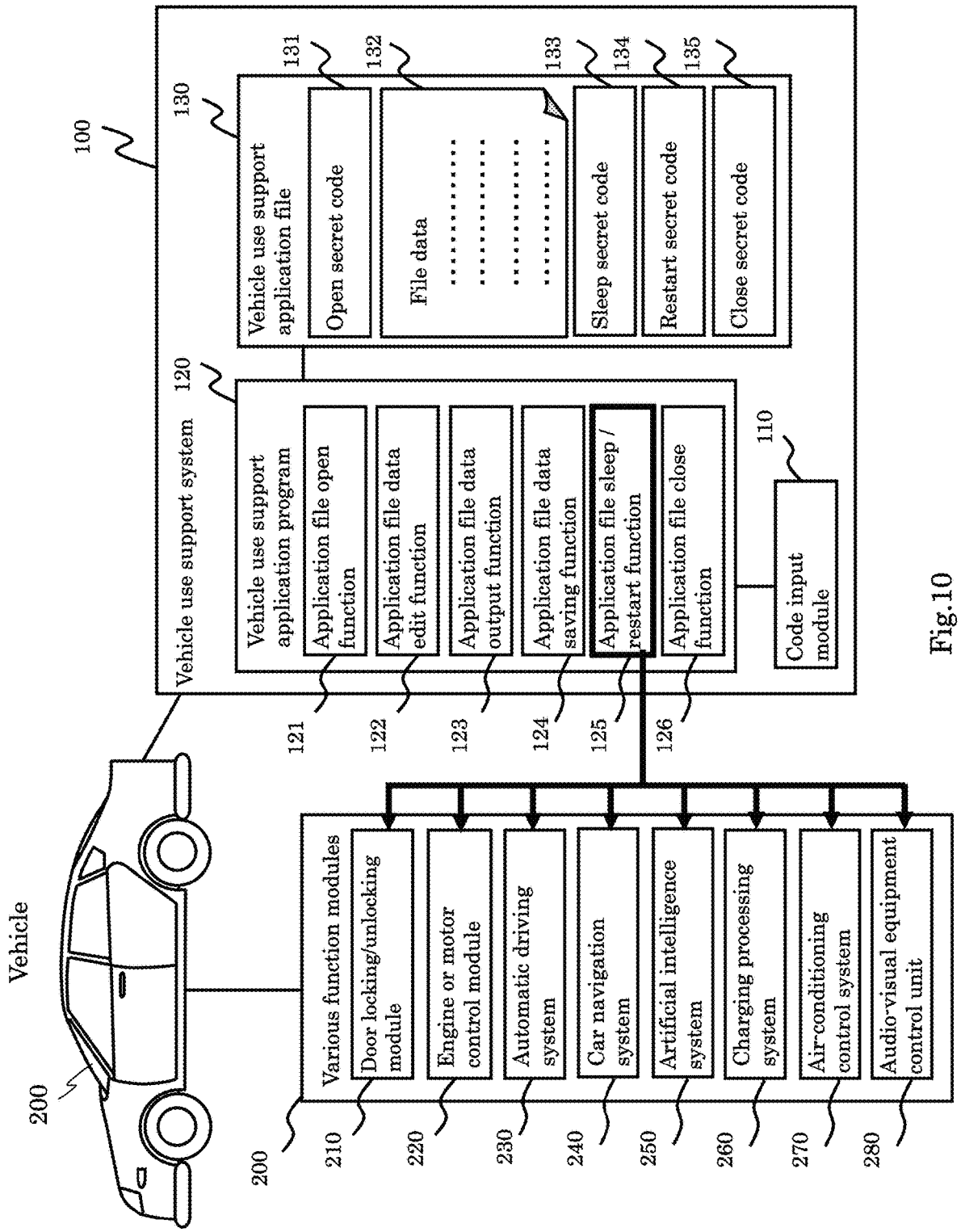
FIG. 10 is a schematic view showing the basic operation flow (2) in which various functions of the vehicle are in a sleep state by temporary parking.

FIG. 9 and FIG. 10 are schematic views showing the basic operation flow in which various functions of the vehicle are in a sleep state by temporary parking.

The user inputs the sleep secret code via the code input means 110. Here, the sleep secret code is inputted by the example shown in FIG. 4, and the sleep secret code is inputted by putting and scanning the fingertip of the index finger to the joint side.

When the application file sleep/restart function 125 of the vehicle use support application 120 authenticates the sleep secret code and the authentication is established, a marking is applied to the portion of the data at the time of entering the sleep state out from the sequence of the data written in the file data part 132, and the vehicle use support application 120 and the vehicle use support application file 130 are made into a sleep state.

(8) The driving is restarted

Here, the user finishes the required business, returns to the vehicle 200, and restarts the driving of the vehicle 200.

The user inputs the restart secret code through the code input means 110. In this case, the restart secret code is inputted by the example shown in FIG. 4. The restart secret code is inputted by putting and scanning from the joint side of the index finger to the fingertip.

When the application file sleep/restart function 125 authenticates the restart secret code and the authentication is established, the door is unlocked, the vehicle use support application 120 and the vehicle use support application file 130 are restarted, and the various functions of the vehicle are restarted from the data at the time when the data sequence written in the file data part 132 enters the sleep state.

Figure 11:
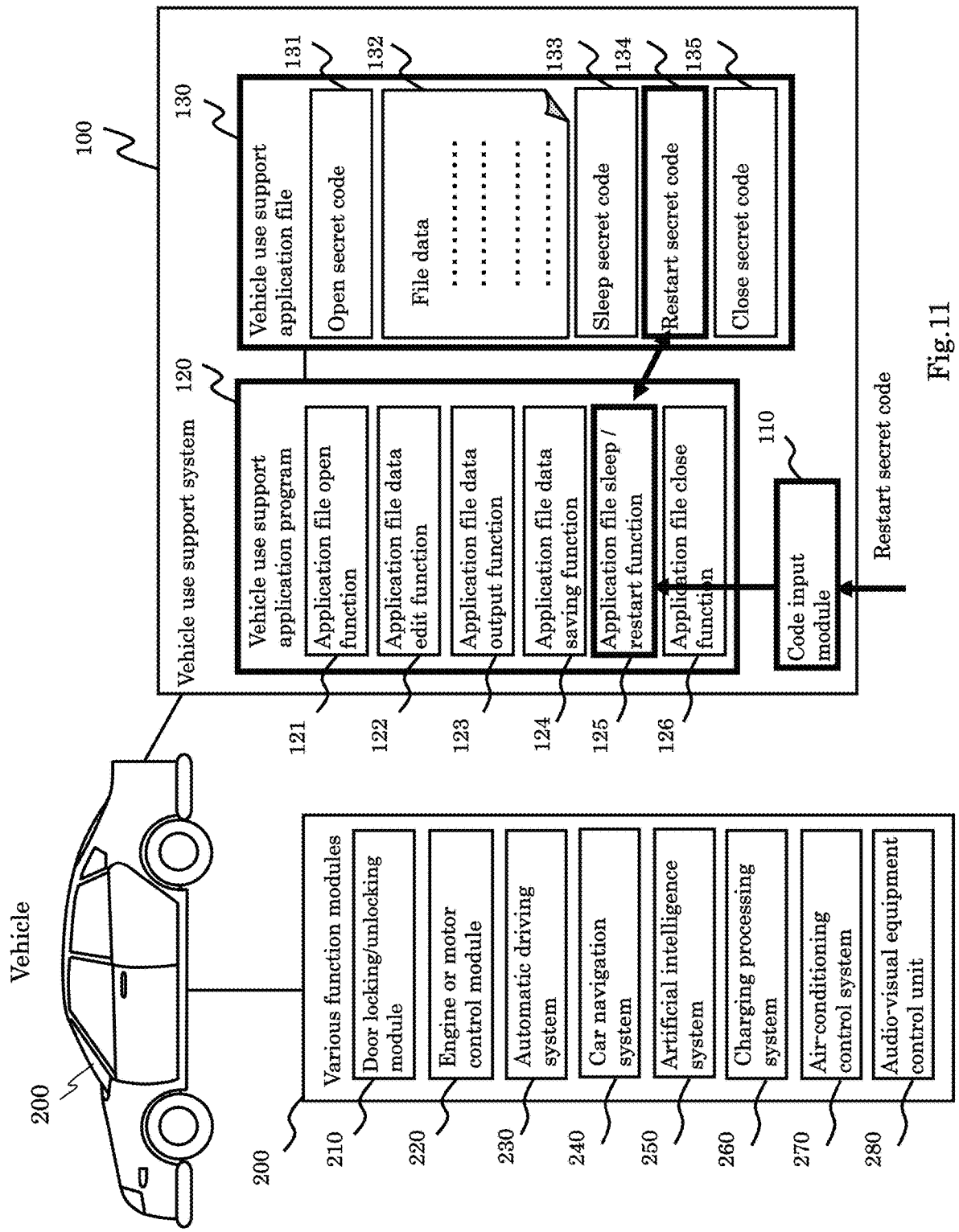
FIG. 11 is a schematic view showing the basic operation flow (1) for resuming various functions of the vehicle.
Figure 12:
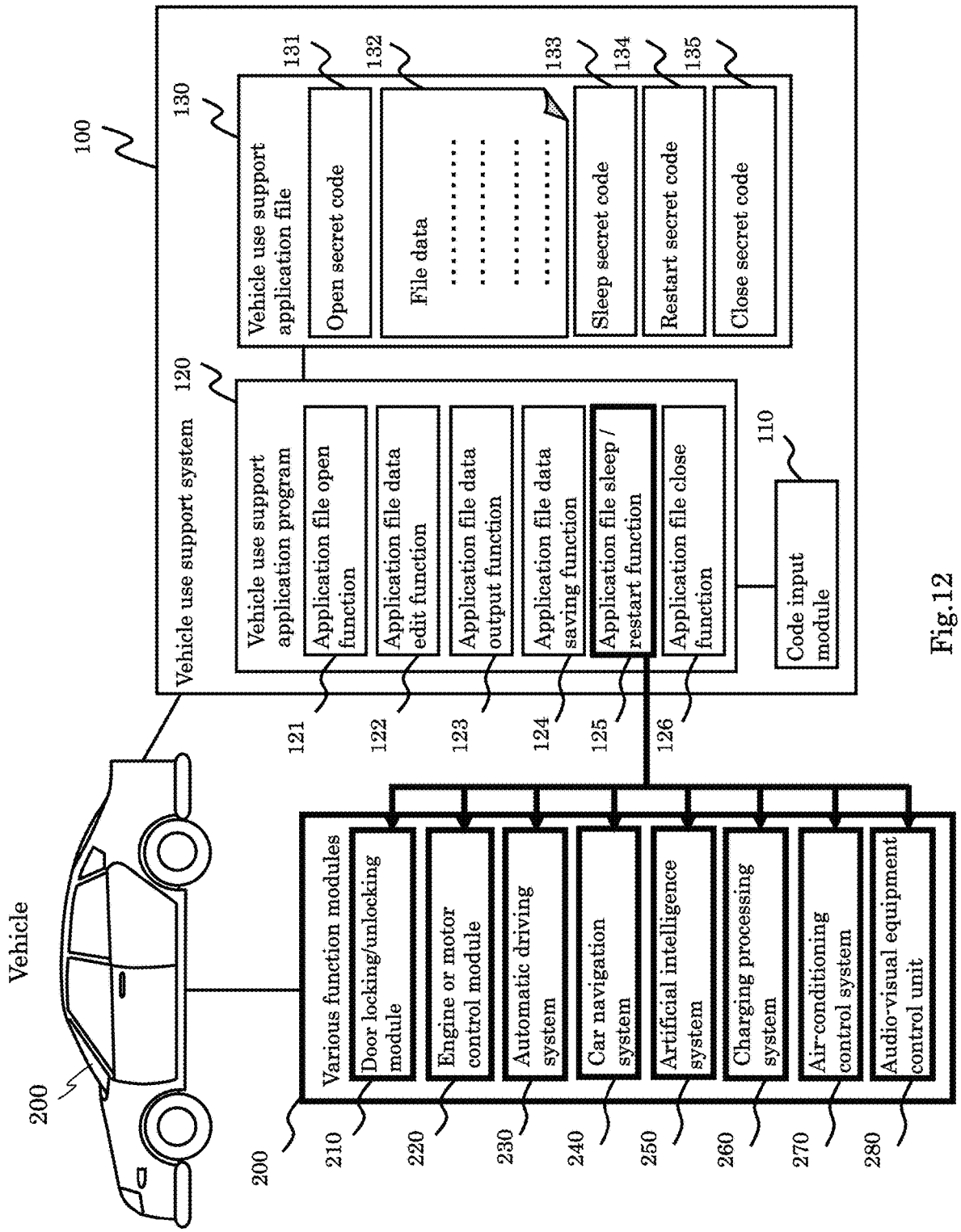
FIG. 12 is a schematic view showing the basic operation flow (2) for resuming various functions of the vehicle.

FIG. 11 and FIG. 12 are schematic views showing the basic operation flow for resuming various functions of the vehicle.

In this case, first, the vehicle leaving the pay parking lot and the charging of the pay parking are determined.

Then, the vehicle drives the toll road R2 from the stop destination B via the general road, and reaches the final destination C. The charging processing of the use charge of the toll road R2 is also performed.

(9) The traveling processes are finished

The vehicle arrives at the destination C, and all the traveling processes are finished and stored upon reaching the parking place and stopping the vehicle.

Figure 13:
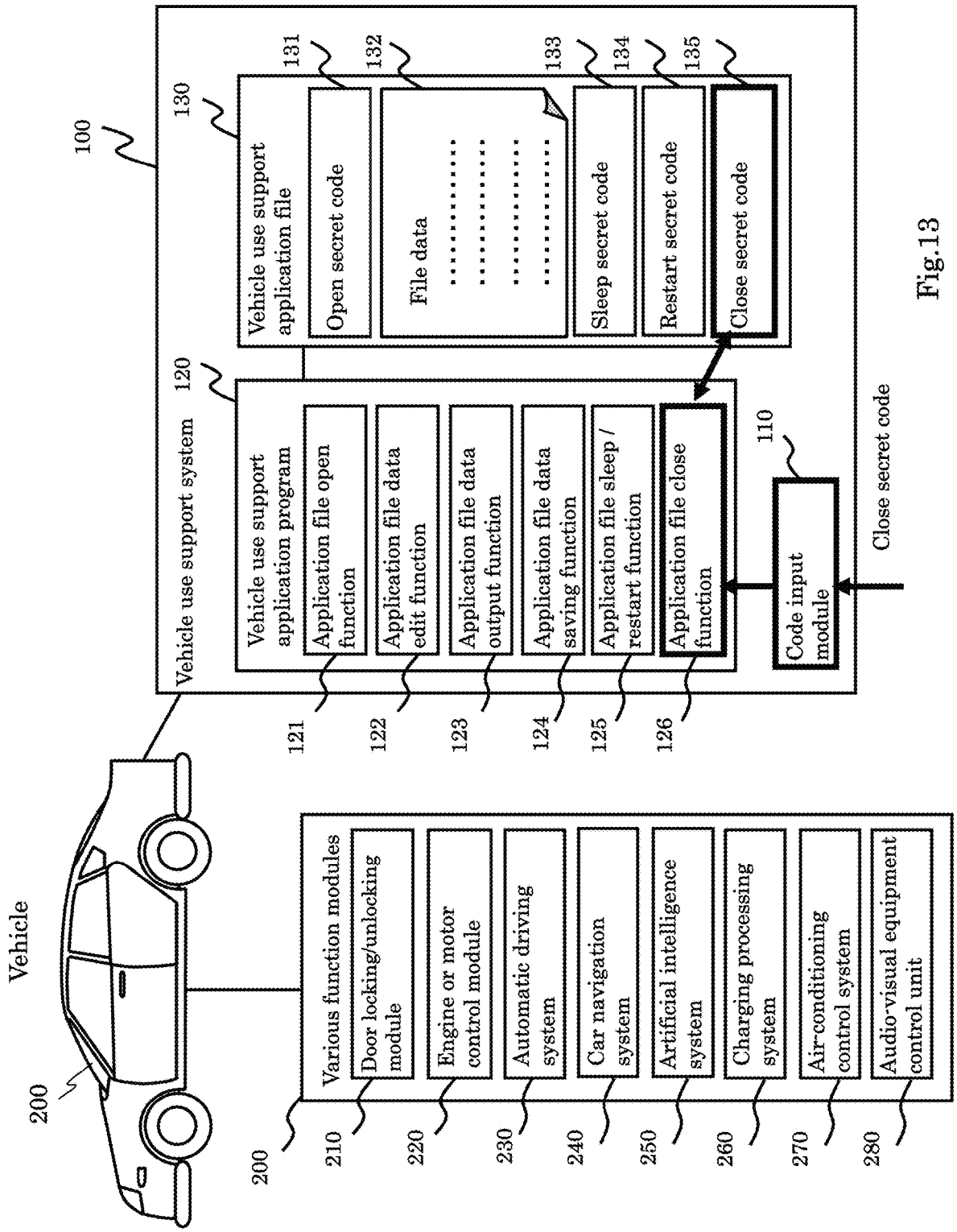
FIG. 13 is a schematic view showing the basic operation flow (1) accompanying the end of operation.
Figure 14:
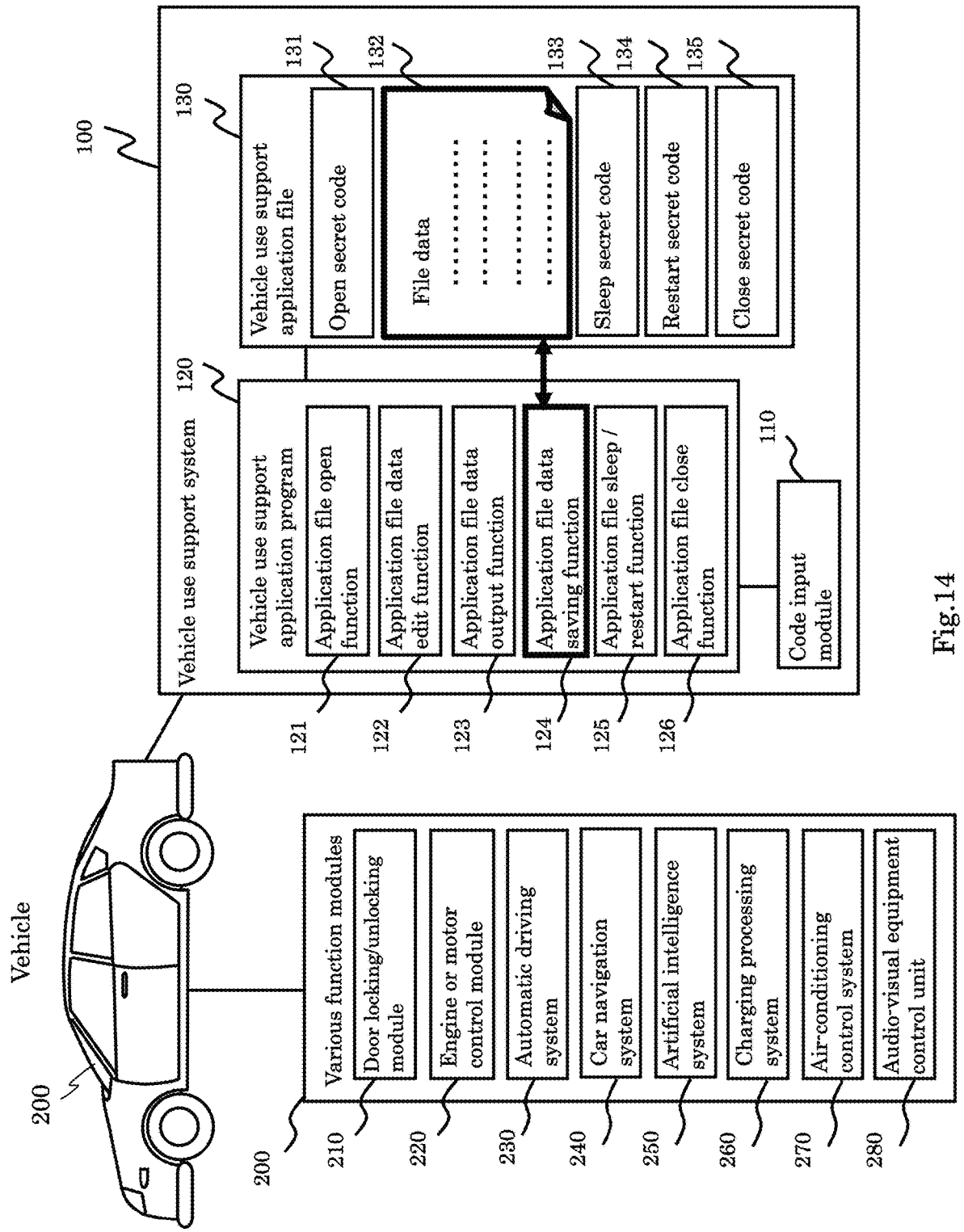
FIG. 14 is a schematic view showing the basic operation flow (2) accompanying the end of operation.

FIG. 13 and FIG. 14 are schematic views showing the basic operation flow accompanying the end of the operation.

In this example, since the rental car is used, the fee for charging the rental car is determined. Also, the charge is determined for using the toll of the toll road R1, R2 and the toll parking lot.

Also, the data of the control contents of various functions of the vehicle performed by the current traveling are approved and determined.

In this case, the contents, the charging state, etc. may be guided through the monitor of the car navigation system and the voice output.

The user gets out of the vehicle 200 and inputs the close secret code through the code input means 110. In this case, the close secret code is inputted by the example shown in FIG. 4. The fingertip of the thumb is put to the fingerprint reader and slid to the joint side. The close secret code is inputted.

The application file closing function 126 of the vehicle use support application 120 authenticates the close secret code. If authentication is established, the application file closing function 126 approves and determines various data including charging on the current running or parking recorded in the file data part 132 of the vehicle use support application file 130, records it through the application file storage function 124, and closes the vehicle use support application file 130 normally. When the charging settlement is credit, it is confirmed that the content is correct as the credit use, and the transaction of the credit settlement can be recognized. Also, various kinds of data can be utilized by recording various data by approving and determining various data related to the traveling or parking. This recorded various data can be reused. These data can be used as big data in conjunction with an external system.

Embodiment 2

The vehicle use support system according to Embodiment 2 of the present invention is described.

Figure 15:
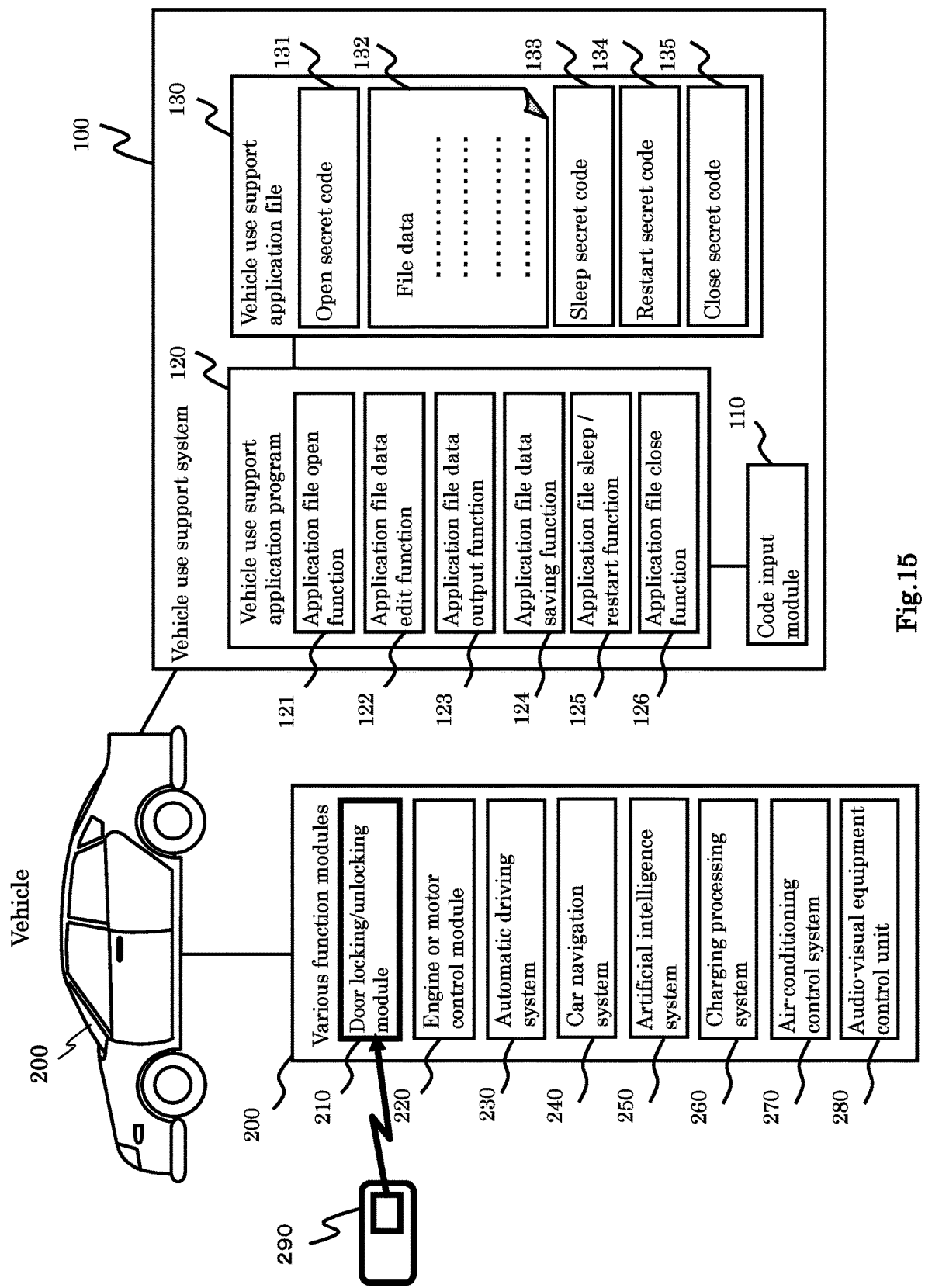
FIG. 15 is a schematic view showing the configuration of the vehicle use support system 100A according to Embodiment 2.

The vehicle use support system of Embodiment 2 shows a second pattern. The vehicle use support application 120 and the vehicle use support application file 130 are provided in the vehicle as shown in FIG. 15, and the code input means 110 is also provided inside the vehicle, and the door locking/unlocking function 210 of the vehicle is operated by an electronic key 290 held by the user. The code input means 110 is provided in a part of the car navigation system.

FIG. 15 is a schematic view showing the simple configuration of the vehicle use support system 100a according to Embodiment 2. In addition to the vehicle use support system 100a, the vehicle 200 and various functions 210-280 of the vehicle are also shown in FIG. 15. The door locking/unlocking function 210 is operated by an electronic key 290.

The door locking/unlocking function 210 may be the same as that of Example 1 except that it is operated by the electronic key 290.

That is, the example operation flows of the vehicle 200 by using the vehicle use support system 100 are as follows; the door unlocking operation by the user with the electronic key 290 is executed as an initial step instead of the door unlocking operation by the door locking/unlocking function 210 as shown as step (3) "Unlock of the door lock" in FIG. 5. After this initial door unlocking step, the following steps are the operation step (1) "Activation of the vehicle use support application 120" shown in FIG. 2, the operation step (2) "Open of the vehicle use support application file 130" shown in FIG. 3, the operation step (4) "Activation of various functions of the vehicle before traveling of the vehicle" shown in FIG. 6, the operation step (5) "Adjustment and change of a travel process and a travel content before traveling of the vehicle start", the operation step (6) (7), (8) and (9) "The traveling processes are finished" including the input close secret code.

Embodiment 3

A vehicle use support system according to Embodiment 3 of the present invention is described.

Figure 16:
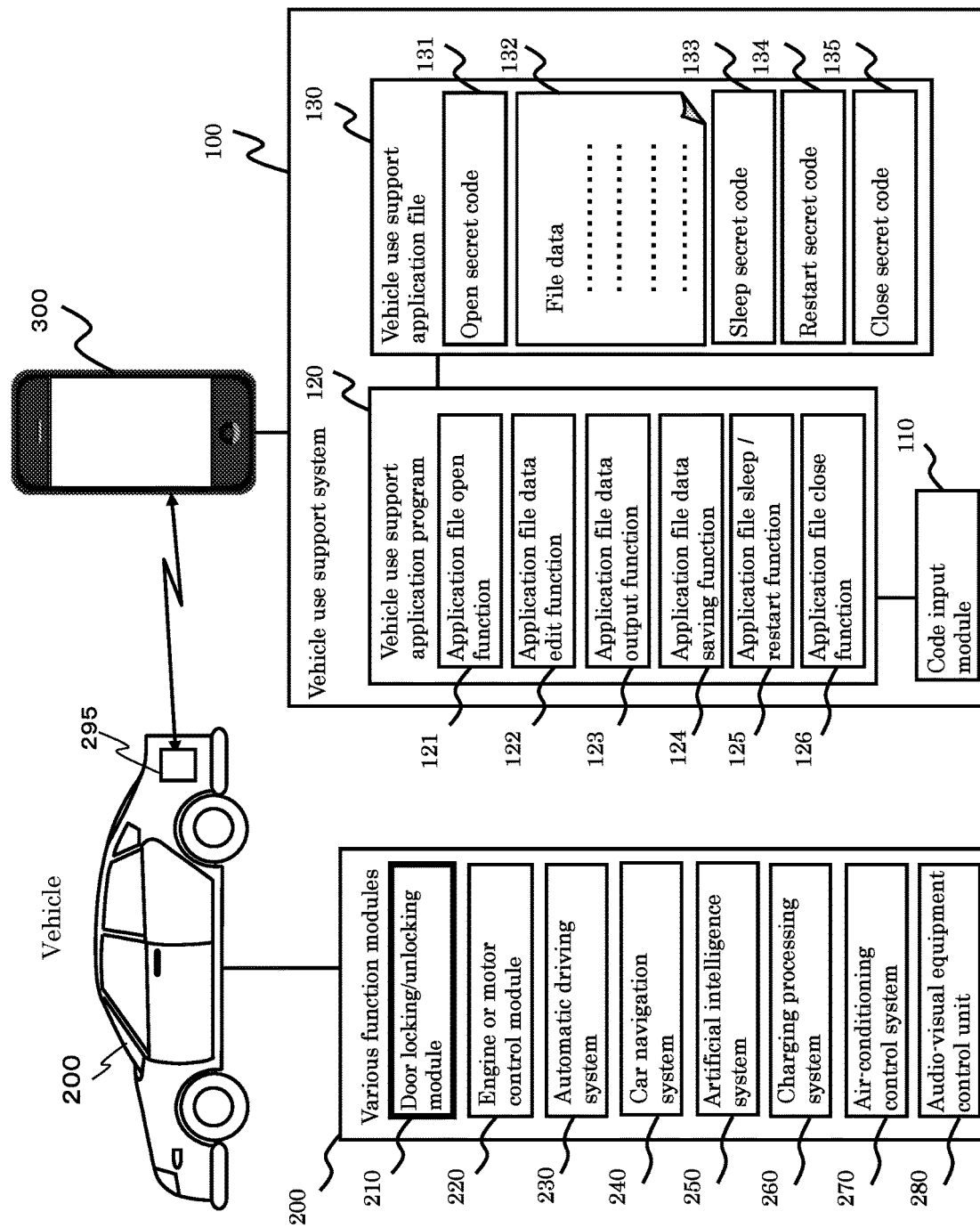
FIG. 16 is a schematic view showing the configuration of the vehicle use support system 100B according to Embodiment 3.

A vehicle use support system according to Embodiment 3 is a third pattern. The vehicle use support application 120, the vehicle use support application file 130, and the code input means 110 are provided on a portable terminal 300 held by a user as shown in FIG. 16. The vehicle mounted unit 295 for receiving a signal transmitted from the portable terminal 300 is mounted on the vehicle 200. For example, a code input means installed in the smart phone device can be employed as the code input means 110. The vehicle mounted unit 295 has a communication function conforming to the communication standard of the portable terminal 300 and can exchange data with the portable terminal 300.

FIG. 16 is a schematic view showing the basic configuration of the vehicle use support system 100b according to Embodiment 3. In addition to the vehicle use support system 100b, the vehicle 200 and the various functions 210-280 of the vehicle and the vehicle mounted unit 295 are also shown in FIG. 16. The portable terminal 300 of the user is also shown in addition to the vehicle 200.

Each operation to the vehicle use support system 100b is input/output via the portable terminal 300 of the user. The same configuration and the same operations as those of the embodiment 1 can be applied except for the data flow exchanging between the various functions of the vehicle through the vehicle mount device 295.

That is, the example of the control of various functions of the vehicle 200 by the vehicle use support system 100b are the same those shown in FIG. 2 to FIG. 14 other than the data flow exchanging between the various functions of the vehicle and the portable terminal 300 via the vehicle mount unit 295.

Hereinafter, the operations via touch screen of the portable terminal 300 are described.

Figure 17:
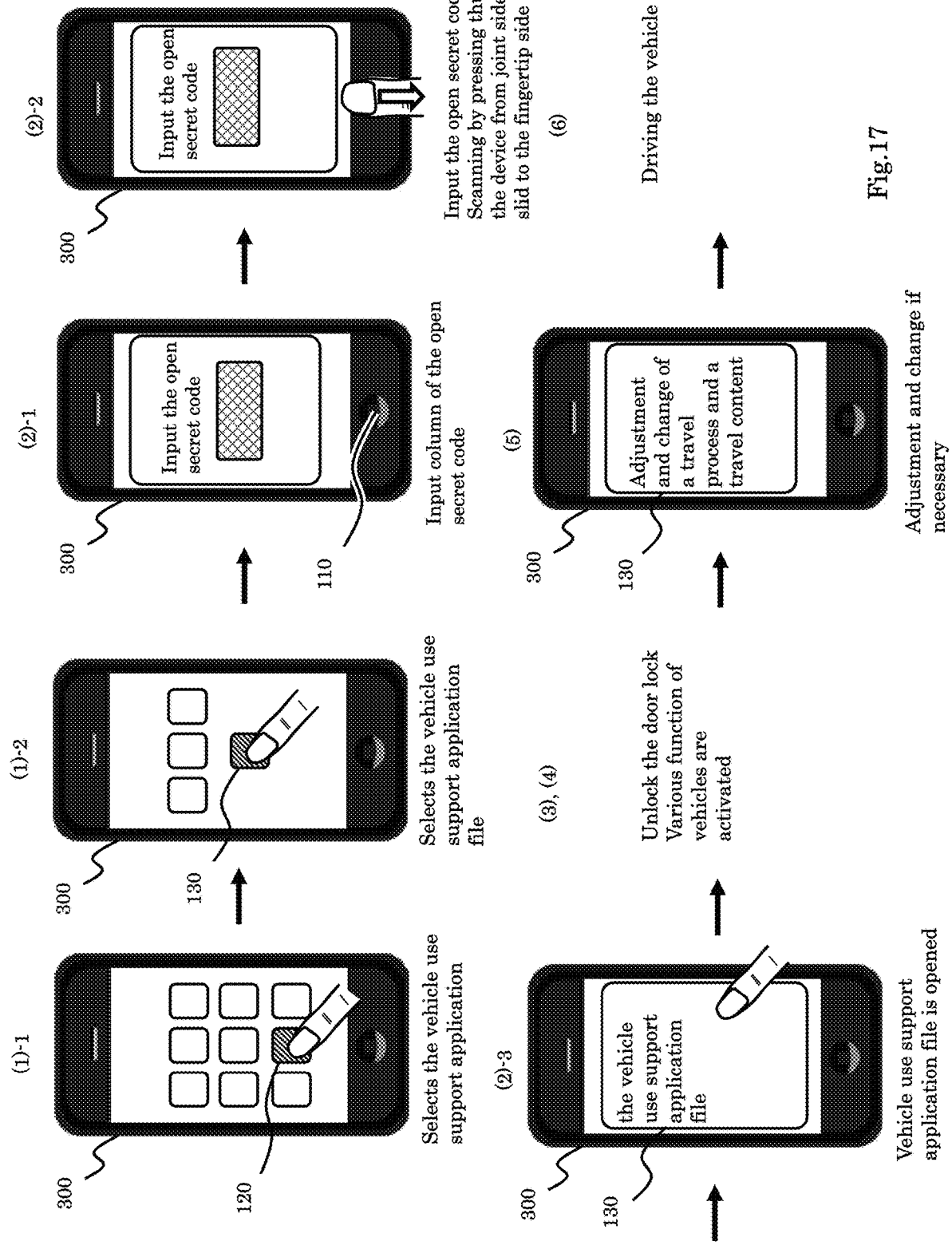
FIG. 17 is a schematic view showing a basic operation flow (1) through the screen of the portable terminal 300.
Figure 18:
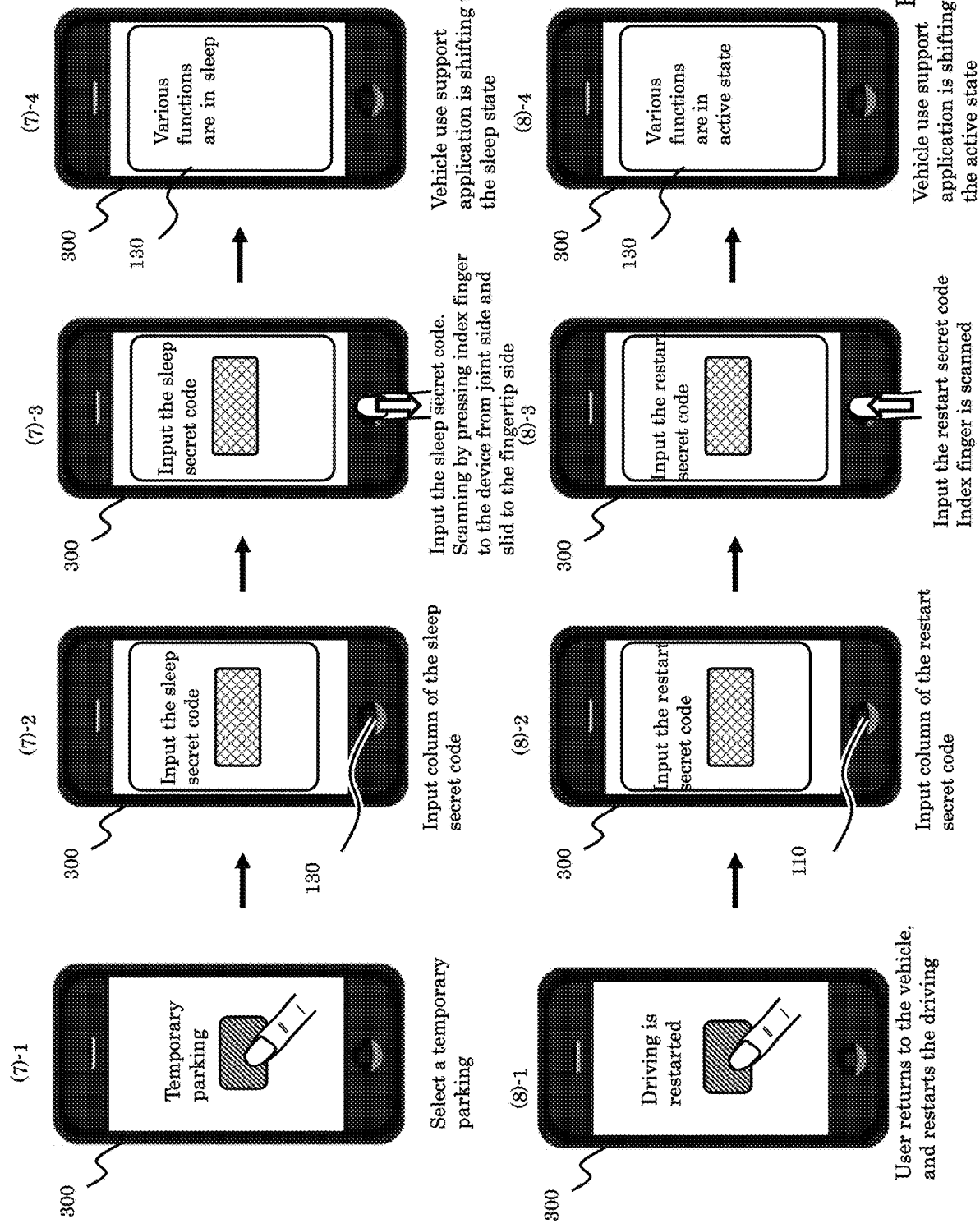
FIG. 18 is a schematic view showing a basic operation flow (2) through the screen of the portable terminal 300.
Figure 19:
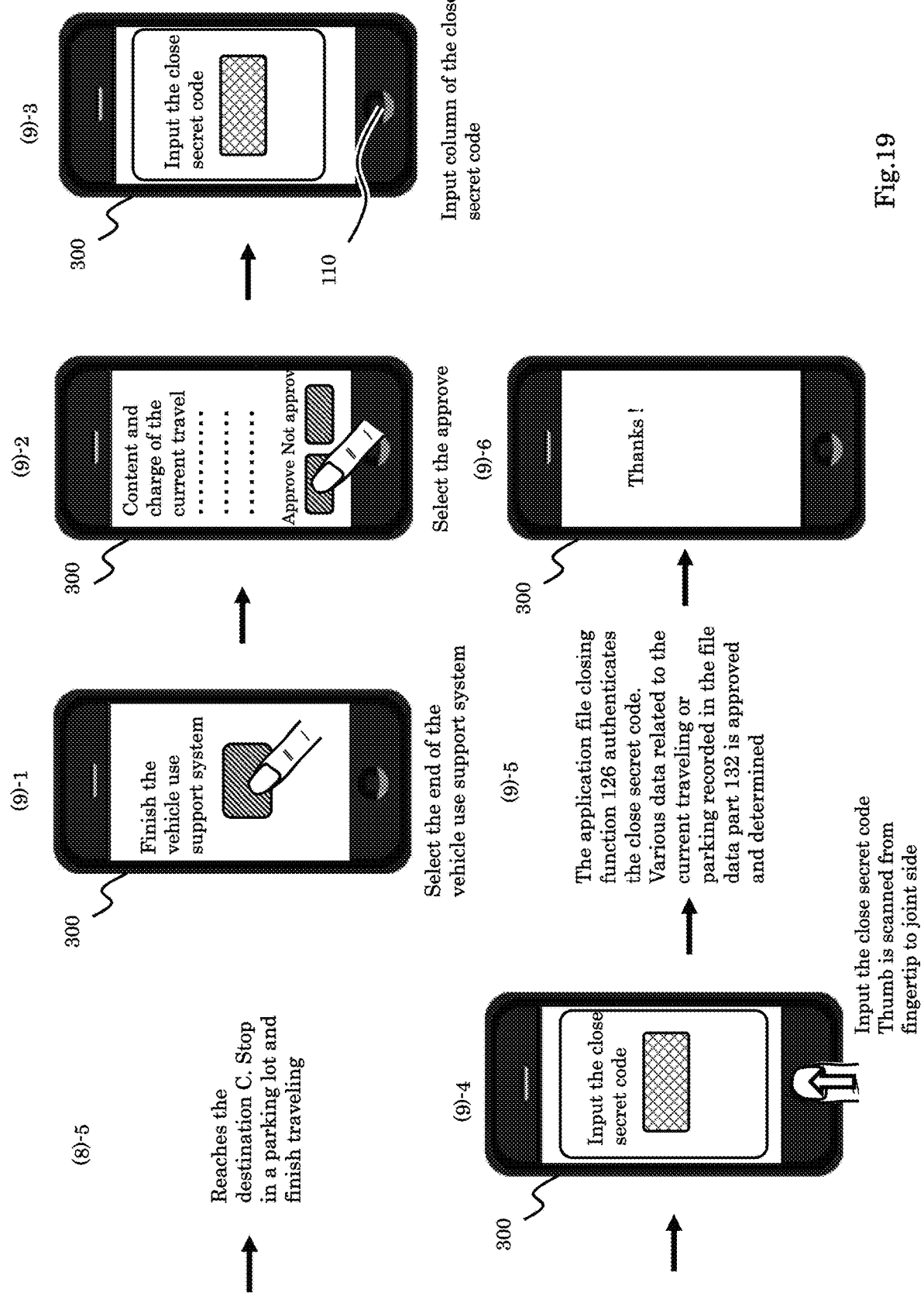
FIG. 19 is a schematic view showing a basic operation flow (3) through the screen of the portable terminal 300.
Figure 20:
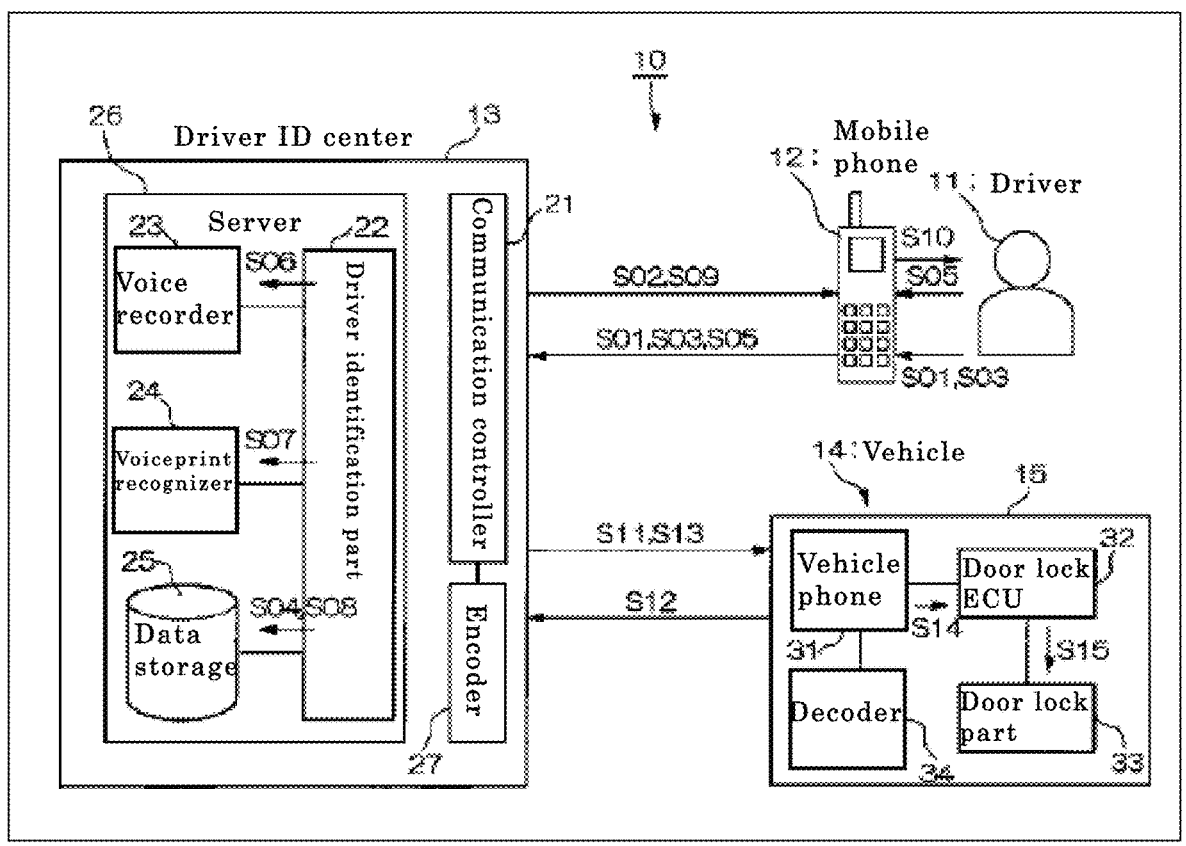
FIG. 20 is schematic view showing the conventional configuration of the vehicle system shown in the JP2001-241229.

FIG. 17 to FIG. 19 are schematic views showing the basic flow of operation through the screen of the portable terminal 300. As an example, a smartphone is used.

The user operates the smart phone 300 to select an icon of the vehicle use support application 120 (FIG. 17 (1)-1).

Further, the vehicle use support application file 130 is selected (FIG. 17 (1)-2).

Then, an input guidance screen to input the open secret code is displayed on the screen of the smartphone 300 (FIG. 17 (2)-1).

The user inputs an open secret code to the code input means 110. Here, the thumb is pressed to the fingerprint reader of the smartphone 300, and the thumb is slid downward from the joint to the fingertip as it is, then the fingerprint pattern data of the thumb is inputted. The fingerprint pattern data is treated as the input of the open secret code (FIG. 17 (2)-2).

Then, the application file unlocking function 121 authenticates the open secret code, and when the authentication is successful, the vehicle use support application file 130 is opened (FIG. 17 (2)-3).

Next, data is read from the file data part 132 of the vehicle use support application file 130 by the application file data output function 123 of the vehicle use support application 120 to control various functions of the vehicle. The door lock is released (FIG. 17 (3)), and the functions of other vehicles are activated (FIG. 17 (4)).

Next, a screen for adjusting and changing the traveling schedule and the traveling content is displayed before starting of the vehicle. If necessary, the traveling schedule and the traveling content can be adjusted and added (FIG. 17 (5)).

After the previous preparation is ready, the engine or the motor is started, and the traveling is started (FIG. 17 (6)).

A case where temporary parking occurs in the travelling schedule is described.

When entering a parking lot for temporarily parking the vehicle around the stop destination B, a selection screen as to whether or not to perform temporary parking processing is displayed, and "the selection" is performed in this case (FIG. 18 (7)-1).

The input guidance screen of the sleep secret code is displayed on the screen (FIG. 18 (7)-2), the user gets off the vehicle to close the door and inputs the sleep secret code. Here, a sleep password code is inputted by pressing the index finger to the fingerprint reader of the smartphone 300. Here, index finger is slid from the joint side to the fingertip side for performing scanning (FIG. 18 (7)-3).

The vehicle use support application 120 controls various functions of the vehicle to a sleep state (FIG. 18 (7)-4).

After the user business and concern is executed at the stop destination B, the restart of the vehicle is started. An operation restart button is displayed on the screen of the smartphone 300, and the operation restart button is pressed (FIG. 18 (8)-1).

The input guidance screen of the restart secret code is displayed (FIG. 18 (8)-2), and the user inputs the restart secret code via the code input means 110 of the smartphone 300. Here, the restart secret code is inputted by pressing the index finger to the fingerprint reader of the smartphone 300. Here, index finger is slid from the fingertip side to the joint side for performing scanning (FIG. 18 (8)-3).

The vehicle use support application 120 restarts the control of the various functions of the vehicle from the sleep state and restarts the operation (FIG. 18 (8)-4).

The travelling schedule is restarted and reaches the destination C (FIG. 19 (8)-5).

When the end screen of the vehicle use support system 100 is displayed on the smartphone 300. The button for ending the vehicle use support system 100 is displayed, the user is pressed this button (FIG. 19(9)-1). A guidance screen for displaying various data such as contents, charges, etc. concerning the current traveling and parking is displayed. When "approval" is selected (FIG. 19 (9)-2), a guidance screen of the input of the "close secret code" is displayed on the smartphone 300 (FIG. 19 (9)-3), and the user inputs "the close secret code" from the code input means 110 of the smartphone 300 (FIG. 19 (9)-3). Here, the close secret code is inputted by pressing the thumb to the fingerprint reader of the smartphone 300 and sliding from the fingertip to the joint side as it is (FIG. 19 (9)-4).

As a result of the input of the close secret code, the application file closing function 126 authenticates the close secret code, and if the authentication succeeds, the application file closing function 126 approves and determines various data related to the current traveling or parking recorded in the file data part 132 of the vehicle use support application file 130, records it through the application file storage function 124, and closes normally (FIG. 19 (9)-5).

Finally, a guidance screen indicating that the vehicle use support system 100b is normally finished is displayed and the vehicle use support system 100 finished (FIG. 19 (9)-6).

While some preferable embodiments of the sample storage according to the present invention are described above, it should be understood that various changes are possible, without deviating from the technical scope according to the present invention. Therefore, the technical scope according to the present invention is limited only by the claims attached.

INDUSTRIAL APPLICABILITY

The present invention can be widely applied to a vehicle use support system employed in various type of vehicle. This vehicle use support system can widely cooperate with other automatic driving system, navigation system, etc.

DESCRIPTION OF THE REFERENCE NUMERALS

100 Vehicle use support system
110 Code input means
120 vehicle use support application
130 vehicle use support application file
200 Vehicle
210 Door locking/unlocking function
220 Engine or motor control function
230 Automatic driving system function
240 Car navigation system function
250 Artificial intelligence system control function
260 Charging processing system function
270 Air-conditioning system control function
280 Audio-visual equipment control function
290 Electronic key
295 Vehicle mounted unit
300 Portable terminal

I claim:

1. A vehicle use support system comprising:
   a vehicle use support application program available in a computer system to operate various function installed in the vehicle;
   a vehicle use support application file which includes an open secret code to open each vehicle use support application file by the vehicle use support application program and a close secret code to close each vehicle use support application file from operable state to inoperable state by the vehicle use support application program;
   a code input;
   wherein the vehicle use support application program comprises:
      an application file open program module that performs authentication between an input code inputted via the code input and the open secret code and opens the vehicle use support application file to be an operable state under the condition that the input code is matched with the open secret code; and
      an application file close program module that performs authentication between an input code inputted via the code input and the close secret code and closes the opened operable state vehicle use support application file recording and fixing the input data generated while the vehicle is being driven under the condition that the input code is matched with the close secret code.

2. A vehicle use support system according to claim 1, wherein the vehicle use support application program comprises:
   an application file data output function to output data to various vehicle modules installed in the vehicle to execute a prescribed function according to input data or recorded data in the vehicle use support application file;
   an application file data edit function that accepting and performs the data editing operation or data recording operation for data according to the driving performance or parking performance;
   an application file data saving function that saves the data obtained by the data editing operation or the data recording operation stored in the vehicle use support application file.

3. A vehicle use support system according to claim 2, wherein the application file close program module performs steps for:
   approving the data generated and obtained in the driving performance or parking performance obtained and recorded in the vehicle use support application file and saving the approved data; and
   closing the opened operable state vehicle use support application file in inoperable state.

4. A vehicle use support system according to claim 2, wherein the various vehicle modules installed in the vehicle comprise:
   a door locking/unlocking function module,
   an engine or a motor control function module,
   a car navigation system,
   an automatic driving system,
   a charging processing system, an artificial intelligence system,
   an illumination system, air conditioning system,
   an audiovisual equipment control system, or
   a combination thereof.

5. A vehicle use support system according to claim 1, wherein
the vehicle use support application program and the vehicle use support application file are installed in the vehicle, and a code input device is installed to a part of vehicle portion accessible from the outside,
the vehicle use support application program is automatically activated or the vehicle use support application program in the sleep state is automatically re-activated when a user accesses the code input device from the outside, and
the vehicle use support application file is opened and the control of the various vehicle modules installed in the vehicle start or re-start on the condition that the input code which the user inputs is matched with the open secret code.

6. A vehicle use support system according to claim 4, wherein
the vehicle use support application program and the vehicle use support application file are installed in the vehicle, a code input device is installed to a part of vehicle portion inside of the vehicle, and the door locking/unlocking function module can be operable by the electric key by a user,
the vehicle use support application program is automatically activated or the vehicle use support application program in the sleep state is automatically re-activated when the user accesses the code input device after getting in the vehicle, and further, the vehicle use support application file is opened and the control of the various vehicle modules installed in the vehicle can be started or re-started on the condition that the input code which the user inputs is matched with the open secret code.

7. A vehicle use support system according to claim 1, wherein
the vehicle use support application program and the vehicle use support application file are installed in a user portable device, and a vehicle mounted unit which can transmit the data between the user portable terminal and the various vehicle modules installed in the vehicle,
the vehicle use support application program is automatically activated or the vehicle use support application program in the sleep state is automatically re-activated when the user accesses the code input device installed in the user portable terminal, and the vehicle use support application file is opened and the control of the various vehicle modules installed in the vehicle via the vehicle mounted unit can be started or re-started on the condition that the input code which the user inputs is matched with the open secret code.

8. A vehicle use support system according claim 1, wherein
the external systems cooperating with the charging processing system include at least one of a toll road charging system, a parking lot charging system, a rental car charging system, a car sharing charging system, or a combination thereof, and
the application file close function performs steps for:
approving the charging data obtained and recorded in the vehicle use support application file, and
saving the approved charging data and closing the opened operable state vehicle use support application file in inoperable state.

9. A vehicle use support system according to claim 1, wherein
the vehicle use support application program comprises:
an application file data transferring function to output the automatic driving instruction data inputted dynamically by the data editing operation via the application file data edit function or selected from the past the automatic driving instruction data to the automatic driving system, and
the application file close program module performs steps for:
approving the automatic driving instruction data obtained and recorded in the vehicle use support application file,
saving the approved automatic driving instruction data, and
closing the opened operable state vehicle use support application file in inoperable state.

10. A vehicle use support system according to claim 1, wherein the vehicle use support application file comprises:
a sleep secret code to shift the status of the vehicle use support application file from active status to sleep status by the vehicle use support application program, and
a restart secret code to shift the status of the vehicle use support application file from sleep status to active status by the vehicle use support application program in addition to the open secret code and the close secret code; and
the vehicle use support application program further comprises:
an application file sleep function that performs authentication between an input code and the sleep secret code and shifts the opened vehicle use support application file from operable state to sleep state under the condition that the input code is matched with the sleep secret code; and
an application file restart function that performs authentication between an input code and the restart secret code and re-opens the vehicle use support application file to be an operable state under the condition that the input code is matched with the restart secret code.

11. A vehicle use support system according to claim 10, wherein
a user portable terminal includes a remote-control application program to control the vehicle use support application program, and
the vehicle use support application program performs operations comprising:
transferring request information to the remote-control application program for requesting to request an approve of the restart of the various vehicle modules including the engine or motor control function module when the vehicle use support application program restarts from the sleep state by the access via the code input device or when the door locking/unlocking function module can be operable by the electric key;
locking the various vehicle modules including the engine or a motor control function module until the approve of the restart of the various vehicle modules; and
unlocking the various vehicle modules by receiving the approve of the restart of the various vehicle modules from the remote- control application program;

wherein the user can set the vehicle use support application program to lock the various vehicle modules and send the transferring request information to the remote-control application program and unlock the various vehicle modules via the remote-control application program.

12. A vehicle use support system according to claim 1, wherein
each of the vehicle use support application files is collected in a personal folder for each user, and
each personal folder includes a personal folder open secret code to open the personal folder in an operable state by the vehicle use support application program and a personal folder close secret code to close the open state personal folder to be an inoperable state.

13. A vehicle use support system according to claim 1, wherein the open secret code and the close secret code are biological information registered in advance.

14. A vehicle use support system according to claim 13, wherein
the biological information is a fingerprint pattern information, and
the fingerprint pattern information includes fingerprint image data of a corresponding finger scanned by a fingerprint reader and the scan direction data indicating the sliding direction on the fingerprint reader.

15. A vehicle use support system according to claim 1, wherein the vehicle is one of an engine car equipped with a gasoline engine, an electric vehicle equipped with a motor and a hybrid vehicle equipped with both a gasoline engine and motor from the view point of driving device; and is one of a normal vehicle, a mini type vehicle, a normal cargo vehicle, a small cargo vehicle, a taxi vehicle, a rental vehicle, a special purpose vehicle and a bus from the view point of vehicle type classification.

16. A method for controlling vehicle use support system available in a computer system for operating a vehicle use support application file by a vehicle use support application program, wherein the vehicle use support application file includes an open secret code to open each vehicle use support application file by the vehicle use support application program and a close secret code to close each vehicle use support application file from operable state to inoperable state by the vehicle use support application program in the vehicle use support application file, the method comprising:
an opening process of the application file that performs authentication between an input code and the open secret code and opens the vehicle use support application file to be an operable state under the condition that the input code is matched with the open secret code in the vehicle use support application program; and
a closing process of the application file that performs authentication between an input code and the close secret code and closes the opened operable state vehicle use support application file under the condition that the input code is matched with the close secret code in the vehicle use support application program.

17. A method for controlling vehicle use support system available in a computer system according to claim 16, wherein
the open secret code to open each vehicle use support application file and the close secret code to close each vehicle use support application file are included in the vehicle use support application program instead, not included in the vehicle use support application file;
the application file open function performs authentication between an input code and the open secret code and opens the vehicle use support application file to be an operable state under the condition that the input code is matched with the open secret code; and
the application file close function performs authentication between an input code and the close secret code and closes the vehicle use support application file from operable state to inoperable state under the condition that the input code is matched with the close secret code.

18. A vehicle use support system comprising:
a code input; and
a vehicle use support application program available in a computer system to operate various function installed in the vehicle, the vehicle use support application program comprises:
an open secret code to open each vehicle use support application file and a close secret code to close each vehicle use support application,
an application file open program module that performs authentication between an input code inputted via the code input and the open secret code and opens the vehicle use support application file to be an operable state under the condition that the input code is matched with the open secret code; and
an application file close program module that performs authentication between an input code inputted via the code input and the close secret code and closes the opened operable state vehicle use support application file recording and fixing the input data generated while the vehicle is being driven under the condition that the input code is matched with the close secret code.

\* \* \* \* \*